US011018871B2

(12) United States Patent
Sood et al.

(10) Patent No.: US 11,018,871 B2
(45) Date of Patent: May 25, 2021

(54) KEY PROTECTION FOR COMPUTING PLATFORM

(71) Applicant: Intel Corporation, Santa Clara, CA (US)

(72) Inventors: Kapil Sood, Portland, OR (US); Naveen Lakkakula, Chandler, AZ (US); Hari K. Tadepalli, Chandler, AZ (US); Lokpraveen Mosur, Gilbert, AZ (US); Rajesh Gadiyar, Chandler, AZ (US); Patrick Fleming, Portlaoise (IE)

(73) Assignee: Intel Corporation, Santa Clara, CA (US)

( * ) Notice: Subject to any disclaimer, the term of this patent is extended or adjusted under 35 U.S.C. 154(b) by 291 days.

(21) Appl. No.: 15/941,407

(22) Filed: Mar. 30, 2018

(65) Prior Publication Data

US 2019/0044724 A1    Feb. 7, 2019

(51) Int. Cl.
| | |
|---|---|
| *H04L 29/06* | (2006.01) |
| *H04L 9/32* | (2006.01) |
| *H04L 9/08* | (2006.01) |
| *H04L 9/14* | (2006.01) |
| *G06F 21/57* | (2013.01) |
| *G06F 21/60* | (2013.01) |

(52) U.S. Cl.
CPC ............ *H04L 9/3234* (2013.01); *G06F 21/57* (2013.01); *G06F 21/602* (2013.01); *G06F 21/606* (2013.01); *H04L 9/0825* (2013.01); *H04L 9/0861* (2013.01); *H04L 9/0897* (2013.01); *H04L 9/14* (2013.01); *H04L 63/20* (2013.01); *H04L 2209/122* (2013.01)

(58) Field of Classification Search
CPC ... H04L 9/0861; H04L 9/0825; H04L 9/3234; H04L 9/0897; H04L 9/14; H04L 63/20; H04L 2209/122; G06F 21/57; G06F 21/602; G06F 21/606
See application file for complete search history.

(56) References Cited

U.S. PATENT DOCUMENTS

| 9,268,968 | B2 * | 2/2016 | Chen | H04L 9/3073 |
|---|---|---|---|---|
| 9,866,392 | B1 * | 1/2018 | Campagna | H04L 9/14 |
| 9,967,248 | B1 * | 5/2018 | Cheng | H04L 63/0876 |

(Continued)

OTHER PUBLICATIONS

"European Application Serial No. 19160045.1, Extended European Search Report dated Jul. 23, 2019", 8 pgs.

(Continued)

*Primary Examiner* — Sher A Khan
(74) *Attorney, Agent, or Firm* — Schwegman Lundberg & Woessner, P.A.

(57) ABSTRACT

A security accelerator device stores a first credential that is uniquely associated with the individual security accelerator device and represents a root of trust to a trusted entity. The device establishes a cryptographic trust relationship with a client entity that is based on the root of trust, the cryptographic trust relationship being represented by a second credential. The device receives and store a secret credential of the client entity, which is received via communication secured by the second credential. Further, the device executes a cryptographic computation using the secret client credential on behalf of the client entity to produce a computation result.

24 Claims, 10 Drawing Sheets

(56) References Cited

U.S. PATENT DOCUMENTS

| | | | |
|---|---|---|---|
| 10,291,401 B1* | 5/2019 | Norum | H04L 9/3247 |
| 2005/0039022 A1* | 2/2005 | Venkatesan | G06F 21/10 |
| | | | 713/176 |
| 2007/0006282 A1* | 1/2007 | Durham | H04L 63/0209 |
| | | | 726/2 |
| 2007/0110245 A1* | 5/2007 | Sood | H04L 9/0844 |
| | | | 380/270 |
| 2007/0294760 A1* | 12/2007 | Sood | H04L 63/0869 |
| | | | 726/15 |
| 2011/0302410 A1* | 12/2011 | Clarke | H04L 9/0872 |
| | | | 713/155 |
| 2013/0268771 A1* | 10/2013 | Blankenbeckler | H04L 9/0894 |
| | | | 713/189 |
| 2014/0173274 A1* | 6/2014 | Chen | H04L 9/3073 |
| | | | 713/155 |
| 2015/0078550 A1* | 3/2015 | Ferguson | H04L 9/0861 |
| | | | 380/44 |
| 2015/0229471 A1* | 8/2015 | Nair | H04L 9/0822 |
| | | | 713/171 |
| 2015/0242614 A1* | 8/2015 | Scagnol | H04L 43/065 |
| | | | 726/2 |
| 2015/0278531 A1* | 10/2015 | Smith | H04L 9/30 |
| | | | 713/165 |
| 2015/0358294 A1* | 12/2015 | Kancharla | G06F 21/335 |
| | | | 713/164 |
| 2016/0127333 A1* | 5/2016 | Sood | H04L 9/088 |
| | | | 380/44 |
| 2017/0005999 A1* | 1/2017 | Choyi | H04L 63/0823 |
| 2017/0006030 A1* | 1/2017 | Krishnamoorthy et al. | |
| | | | H04L 9/3263 |
| 2017/0272945 A1* | 9/2017 | Link, II | H04L 9/3242 |
| 2017/0351879 A1* | 12/2017 | Sion | G06F 21/606 |
| 2018/0004930 A1* | 1/2018 | Csinger | H04L 9/3234 |
| 2018/0091551 A1* | 3/2018 | Palanigounder | H04L 9/3247 |
| 2018/0357183 A1* | 12/2018 | Kumar | H04L 9/088 |
| 2019/0058588 A1* | 2/2019 | Chen | H04L 9/0863 |
| 2019/0087577 A1* | 3/2019 | Doliwa | G06F 21/602 |

OTHER PUBLICATIONS

"European Application Serial No. 19160045.1, Response filed Jan. 9, 2020 to Extended European Search Report dated Jul. 23, 2019", 24 pgs.

* cited by examiner

KEY PROTECTION FOR COMPUTING PLATFORM

TECHNICAL FIELD

Embodiments described herein generally relate to data processing and network communication systems, and in particular, to techniques for establishing and implementing functionality for data processing and security authentication for communication networks.

BACKGROUND

The security of cryptographic protocols used to protect data and platform trust relies on the security of cryptographic keys. Growing sophistication in software and hardware attacks, cloud usage, and regulatory requirements mandate that private keys should not be exposed in the clear during their entire life cycle: generation, storage, and run time.

Regulated industries such as banking, healthcare, and e-commerce use customer passwords, keys, and personal identification numbers (PINs) that are secured through industry-certified key management devices sometimes referred to a hardware security modules (HSMs). HSMs may be deployed by enterprises in standalone configurations or by cloud service providers as a service offering. While offering high levels of security for key management and crypto services, traditional HSM appliances have the drawback of a high price to performance ratio and generally use purpose-built hardware, making them difficult to be scaled as a virtual network function (VNF).

Today, uses of HSMs are found in only a few information technology niches due to their very high price-to-performance ratio. Cloud migration of enterprise applications, together with regulatory compliance, call for clients' cryptographic keys to be invisible to the cloud operator in addition to being immune to software attacks. While cloud operators may provide or integrate HSMs as an additional service, increasing HSM bandwidths to the cloud scale can be impractically expensive. In many cases, cryptographic keys are found to be the last pieces of infrastructure that could not be migrated to the cloud for security and compliance reasons. In this backdrop, HSM vendors and Cloud Service Providers are also looking for ways to virtualize the HSM functions without compromising security.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
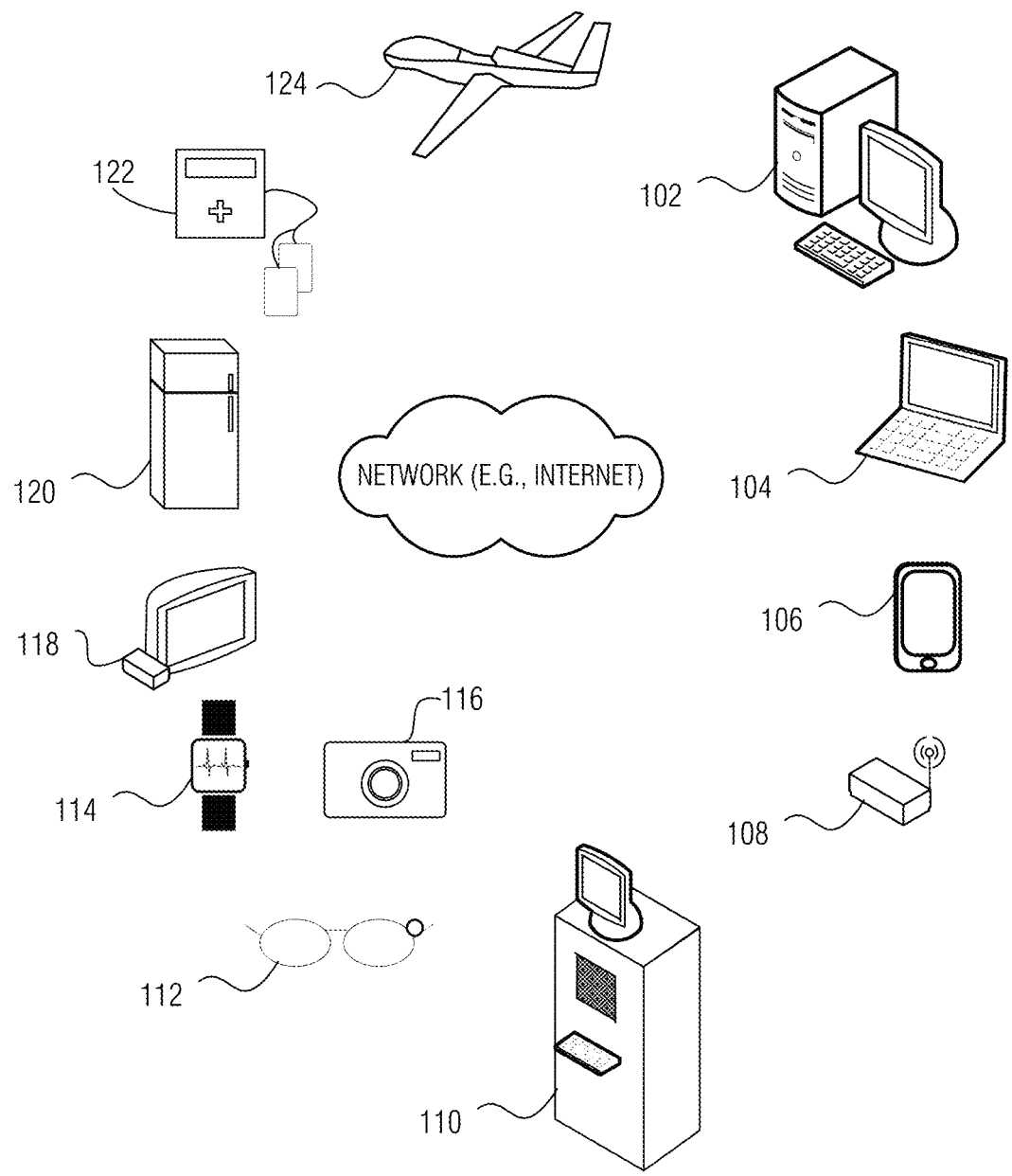
FIG. 1 is a high-level diagram illustrating some examples of various types of computing platforms with which aspects of the present subject matter may be used.

In the following description, methods, configurations, and related apparatuses are disclosed to provide secret/key provisioning and secure cryptographic security processing within a variety of computing devices, computing device components, and networked systems including, for example, general-purpose computing systems and their platforms (e.g., memory controllers, disk controllers, multi-domain trust separation technologies, network interface controllers, etc.), internet-of-things (IoT) devices, network function virtualization (NFV) systems, virtual machine (VM) systems, Universal Terrestrial Radio Access Networks (UTRANs) and the like.

Advantageously, various aspects can provide a consistent, uniform, scalable and high-performance mechanism for protecting keys for NFV, 5G/MEC workloads, with high performance/low-latency key protection for 400+ Gbps traffic encryption for SmartNICs, base stations, user equipment, and the like. Other applications include virtualized workloads, containers, virtualized network functions such as those defined in European Telecommunications Standards Institute (ETSI) NFV specifications, packet processing workloads, virtual evolved packet core (vEPC), virtual customer premises equipment (vCPE), central office re-architected as a datacenters (CORDs), etc. Moreover, aspects may support virtualization and container deployments, and integration into OpenStack and ONAP (ATT's NFV Orchestrator) systems. Multi-domain separation technologies can be enabled to connect securely to security accelerators in the same NFVI. Aspects of the disclosure can extend key agility into compute memory protection technologies and to accelerators which are in off-compute configurations.

Aspects of the disclosure can enhance NFV/5G products that addresses specific NFV and 5G security requirements (e.g. ETSI NFV SEC 012, SEC013 specifications). Some aspects can extend the a hardware-mediated execution enclave to accelerators, including security, AI/ML and FPGA accelerators.

High-performance encryption is now ubiquitous in virtually all of today's Telco, NFV, 5G and Edge/Mobile Edge Cloud systems. Multiple levels of network traffic encryption are employed, largely driven by privacy, data protection, and regulatory concerns. Thus, securing the encryption keys on the platform hardware (e.g., in transit, at rest and while in use) is considered to be important for running NFV and 5G workloads on general purpose computing platforms. NFV and 5G deployments see infrastructure, client, and enterprise traffic on the same NFV virtual and physical networks, and these should be cryptographically separated into trust domains (e.g., with keys that are never disclosed) so that each of these trust domains maintains clear ownership of, and sovereignty over, their own data.

Aspects of the present subject matter may be applied in a variety of use cases such as security processing of network traffic, disk encryption, private key operations, memory encryption, trusted execution environments, trust domains management, etc. Solutions described herein may be used to implement various standards or requirements, including ETSI NFV SEC, ETSI MEC, and NGMN 5G White Paper requirements.

Another important feature is encryption and integrity protection of all data and processing instructions on computing platforms. Today, various technologies provide cryptographic encryption, integrity and replay protection on the central processor unit (CPU)-host memory channel. Accordingly, client workloads (such as VNFs, virtual machines (VMs), containers, etc.) can run in cryptographically separate memory locations.

FIG. 1 is a high-level diagram illustrating some examples of various types of computing platforms with which aspects of the present subject matter may be used. The computing platforms include servers or personal computers, such as PC 102, laptop 104, smartphone/tablet 106, and the like. Other types of information devices, such as networking appliance 108, which represents a switch, router, access point, etc., are computing platforms that are also contemplated. Industrial equipment 110, such as control systems, automated tooling, motor/robotics controls, programmable logic controllers, are also types of computing platforms on which aspects of the embodiments may be implemented. Computing platforms may also be implemented as consumer-electronic devices, such as smart glasses 112, smartwatch 114, digital camera 116, and media device 118, such as a set-top box as depicted, audio playback system, etc. Appliance 120 may also contain a computing system such as, for instance, an Internet-of-Things (IoT) node. Medical device 122 may contain an embedded computing platform. Likewise vehicle 124 may also contain one or more computing platforms. Each computing platform may include a processor-based system, e.g., a machine capable of executing instructions that specify actions to be taken by that machine.

Figure 2:
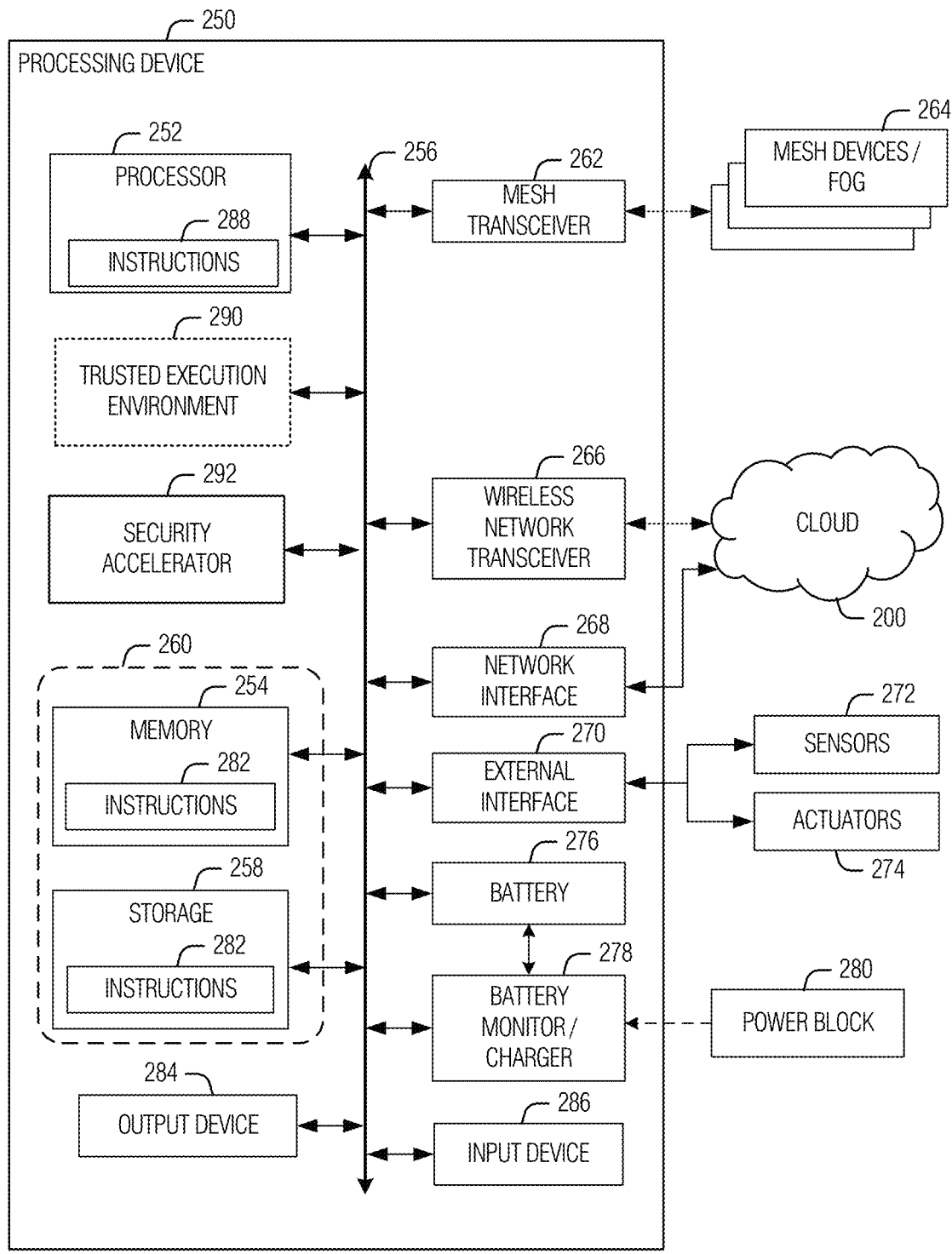
FIG. 2 is a block diagram of an example of components that may be present in a processing device of a computing platform (such as any of the computing platforms shown in FIG. 1, for instance) for implementing the techniques described herein.

FIG. 2 is a block diagram of an example of components that may be present in a processing device 250 of a computing platform (such as any of the computing platforms shown in FIG. 1, for instance) for implementing the techniques described herein. The processing device 250 may include any combinations of the components shown in the example or referenced in the disclosure above. The components may be implemented as ICs, portions thereof, discrete electronic devices, or other modules, logic, hardware, software, firmware, or a combination thereof adapted in the processing device 250, or as components otherwise incorporated within a chassis of a larger system. Additionally, the block diagram of FIG. 2 is intended to depict a high-level view of components of the device 250. However, some of the components shown may be omitted, additional components may be present, and different arrangement of the components shown may occur in other implementations.

Processing device 250 may include a processor 252, which may be a microprocessor, a multi-core processor, a multithreaded processor, an ultra-low voltage processor, an embedded processor, or other known processing element. The processor 252 may be a part of a system on a chip (SoC) in which the processor 252 and other components are formed into a single integrated circuit, or a single package.

The processor 252 may communicate with a system memory 254 over an interconnect 256 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4).

To provide for persistent storage of information such as data, applications, operating systems and so forth, a storage 258 may also couple to the processor 252 via the interconnect 256. In an example the storage 258 may be implemented via a solid state disk drive (SSDD). Other devices that may be used for the storage 258 include flash memory cards, such as SD cards, microSD cards, xD picture cards, and the like, and USB flash drives. In low power implementations, the storage 258 may be on-die memory or registers associated with the processor 252. However, in some examples, the storage 258 may be implemented using a micro hard disk drive (HDD). Further, any number of new technologies may be used for the storage 258 in addition to, or instead of, the technologies described, such resistance change memories, phase change memories, holographic memories, or chemical memories, among others.

The components may communicate over the interconnect 256. The interconnect 256 may include any number of technologies, including industry standard architecture (ISA), extended ISA (EISA), peripheral component interconnect (PCI), peripheral component interconnect extended (PCIx), PCI express (PCIe), or any number of other technologies. The interconnect 256 may be a proprietary bus, for example, used in a SoC based system. Other bus systems may be included, such as an I2C interface, an SPI interface, point to point interfaces, and a power bus, among others.

The interconnect 256 may couple the processor 252 to a transceiver 262, for communications with a cloud, fog, or mesh network devices 264. The transceiver 262 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the devices 264. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit. Various network components may also be virtualized according to some implementations.

The transceiver 262 may communicate using multiple standards or radios for communications at different range. For example, the device 250 may communicate with close devices, e.g., within about 10 meters, using a local transceiver based on BLE, or another low power radio, to save power. More distant devices 264, e.g., within about 50 meters, may be reached over ZigBee or other intermediate power radios. Both communications techniques may take place over a single radio at different power levels, or may take place over separate transceivers, for example, a local transceiver using BLE and a separate transceiver using ZigBee.

A wireless network transceiver 266 may be included to communicate with devices or services in the cloud 200 via local or wide area network protocols. The wireless network transceiver 266 may be a LPWA transceiver that follows the IEEE 802.15.4, or IEEE 802.15.4g standards, among others. The device 250 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the transceiver 262 and wireless network transceiver 266, as described herein. For example, the radio transceivers 262 and 266 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 262 and 266 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 266, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 268 may be included to provide a wired communication to the cloud 200 or to other devices, such as the devices 264. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 268 may be included to allow connect to a second network, for example, a NIC 268 providing communications to the cloud over Ethernet, and a second NIC 268 providing communications to other devices over another type of network.

The interconnect 256 may couple the processor 252 to an external interface 270 that is used to connect external devices or subsystems. The external devices may include sensors 272, such as accelerometers, level sensors, flow sensors, optical light sensors, camera sensors, temperature sensors, a global positioning system (GPS) sensors, pressure sensors, barometric pressure sensors, and the like. The external interface 270 further may be used to connect the device 250 to actuators 274, such as power switches, valve actuators, an audible sound generator, a visual warning device, and the like.

In some optional examples, various input/output (I/O) devices may be present within, or connected to, the device 250. For example, a display or other output device 284 may be included to show information, such as sensor readings or actuator position. An input device 286, such as a touch screen or keypad may be included to accept input. An output device 284 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the device 250.

A battery 276 may power the device 250, although in examples in which the device 250 is mounted in a fixed location, it may have a power supply coupled to an electrical grid. The battery 276 may be a lithium ion battery, or a metal-air battery, such as a zinc-air battery, an aluminum-air battery, a lithium-air battery, and the like.

A battery monitor/charger 278 may be included in the device 250 to track the state of charge (SoCh) of the battery 276. The battery monitor/charger 278 may be used to monitor other parameters of the battery 276 to provide failure predictions, such as the state of health (SoH) and the state of function (SoF) of the battery 276. The battery monitor/charger 278 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 278 may communicate the information on the battery 276 to the processor 252 over the interconnect 256. The battery monitor/charger 278 may also include an analog-to-digital (ADC) convertor that allows the processor 252 to directly monitor the voltage of the battery 276 or the current flow from the battery 276. The battery parameters may be used to determine actions that the device 250 may perform, such as transmission frequency, mesh network operation, sensing frequency, and the like.

A power block 280, or other power supply coupled to a grid, may be coupled with the battery monitor/charger 278 to charge the battery 276. In some examples, the power block 280 may be replaced with a wireless power receiver to obtain the power wirelessly, for example, through a loop antenna in the device 250. A wireless battery charging circuit, such as an LTC4020 chip from Linear Technologies of Milpitas, Calif., among others, may be included in the battery monitor/charger 278. The specific charging circuits chosen depend on the size of the battery 276, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 258 may include instructions 282 in the form of software, firmware, or hardware commands to implement the techniques described herein. Although such instructions 282 are shown as code blocks included in the memory 254 and the storage 258, it may be understood that any of the code blocks may be replaced with hardwired circuits, for example, built into an application specific integrated circuit (ASIC).

In an example, the instructions 282 provided via the memory 254, the storage 258, or the processor 252 may be embodied as a non-transitory, machine-readable medium 260 including code to direct the processor 252 to perform electronic operations in the device 250. The processor 252 may access the non-transitory, machine readable medium 260 over the interconnect 256. For instance, the non-transitory, machine readable medium 260 may be embodied by devices described for the storage 258 of FIG. 2 or may include specific storage units such as optical disks, flash drives, or any number of other hardware devices. The non-transitory, machine readable medium 260 may further include, provide, or invoke instructions 288 to direct the processor 252 to perform a specific sequence or flow of actions, for example, as described with respect to the flowchart(s) and block diagram(s) of operations and functionality depicted above.

In an example, the instructions 288 on the processor 252 (separately, or in combination with the instructions 288 of the machine readable medium 260) may configure execution or operation of a trusted execution environment (TEE) 290. In an example, the TEE 290 operates as a protected area accessible to the processor 252 to enable secure access to data and secure execution of instructions. Various implementations of the TEE 290, and an accompanying secure area in the processor 252 or the memory 254 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 250 through the TEE 290 and the processor 252. Further, in some examples, the TEE 290 is also capable of communicating using communication facilities of processing device 250 that are described below in greater detail, or a dedicated communication circuit independent of those communication facilities, also known as "out-of-band" communication.

In an example, TEE 290 may provide a hardware-isolated TEE. In another example, TEE 290 provides one or more secure enclaves via software isolation techniques using machine-readable medium 260. Each secure enclave may provide a protected region of memory that stores code and data that is measured, validated, or otherwise authenticated. Additionally, the contents of the secure enclave may be protected from access by software executing outside of the same secure enclave.

In a related example, the contents of TEE 290 may be protected from access or tampering using any combination of hardware protection or cryptographic protection. In some embodiments, a part of, or the entire, secure enclave may be stored in a specialized memory structure such as an enclave page cache (EPC).

In an example, processing device 250 may also include security accelerator 292. Security accelerator 292 may be embodied as any hardware component(s) or circuitry capable of persistently storing cryptographic keys in an isolated TEE. In an example, security accelerator 292 may include coprocessor circuitry that is optimized for permanently storing public and private keys, and carrying out cryptography-related computations. In another example, security accelerator may be implemented as part of a digital rights management (DRM) coprocessor. Execution of security-related operations by security accelerator 292 may be independent and secure from other code executed by processor 252 and TEE 290. Security accelerator 292 may include a set of secure registers for storing cryptographic keys. The secure registers may be organized as a set of n-bit registers (with n being 32, 64, 128, etc.). In one example, the secure registers are implemented using non-volatile memory, such as flash or EEPROM memory. In another example, the secure registers are implemented using a programmable read-only memory (PROM) that can be written only once. In a related example, the secure registers are implemented using factory-programmable fuses, or field-programmable fuses, either of which are also a form of permanent (i.e., one-time-writable) memory.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components, circuitry, engines, or modules in order to more particularly emphasize their implementation independence. Such components may be embodied by a variety of hardware-based forms, including hardware that executes program instructions stored in a non-transitory storage medium. For example, a component, circuit, engine, or module may be implemented as a hardware circuit comprising custom very-large-scale integration (VLSI) circuits or gate arrays, off-the-shelf semiconductors such as logic chips, transistors, or other discrete components. A component, circuit, engine, or module may also be implemented in programmable hardware devices such as field programmable gate arrays, programmable array logic, programmable logic devices, or the like. In the case where a component, circuit, engine, or module incorporates and executes program instructions, it should be noted that those instructions may comprise one or more physical or logical blocks of computer instructions, which may, for instance, be organized as an object, procedure, or function. Nevertheless, the program instructions executable as part of a component, circuit, engine, or module need not be physically located together, but may comprise disparate instructions stored in different locations which, when joined logically together, comprise the component or module and achieve the stated purpose for the component, circuit, engine, or module.

Figure 3:
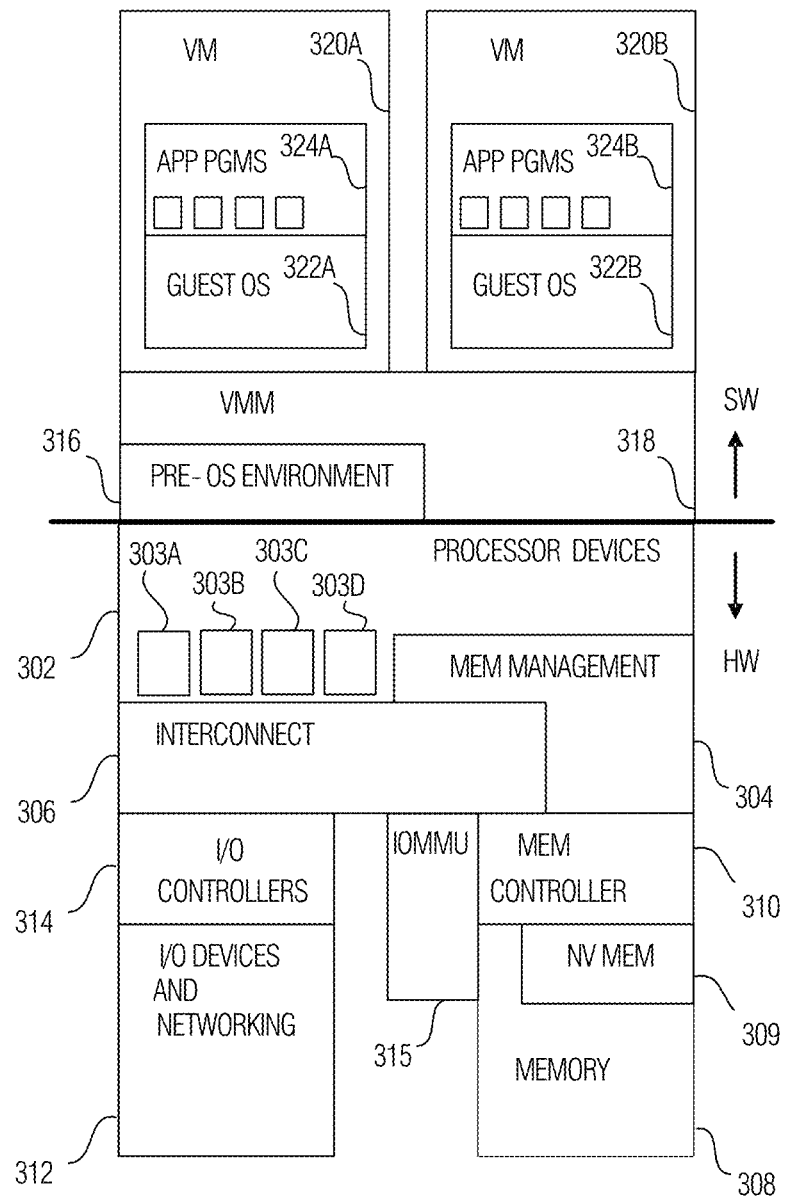
FIG. 3 is a diagram illustrating an exemplary hardware and software architecture of a processing device such as the one depicted in FIG. 2, in which various interfaces between hardware components and software components are shown.

FIG. 3 is a diagram illustrating an exemplary hardware and software architecture of a processing device such as the one depicted in FIG. 2, in which various interfaces between hardware components and software components are shown. As indicated by HW, hardware components are represented below the divider line, whereas software components denoted by SW reside above the divider line. On the hardware side, processor devices 302 (which may include one or more microprocessors 303A, digital signal processors 303B, security accelerators 303C, system management processors 303D, etc., each having one or more processor cores, are interfaced with memory management device 304 and system interconnect 306. Memory management device 304 provides mappings between virtual memory used by processes being executed, and the physical memory. Memory management device 304 may be an integral part of a central processing unit which also includes the processing devices 302.

System interconnect 306 includes a backplane such as memory, data, and control lines, as well as the interface with input/output devices, e.g., PCI, USB, etc., to implement an interconnect fabric or bus architectures, for instance. Memory 308 (e.g., dynamic random access memory (DRAM)) and non-volatile memory 309 such as flash memory (e.g., electrically-erasable read-only memory—EEPROM, NAND Flash, NOR Flash, etc.) are interfaced with memory management device 304 and interconnect 306 via memory controller 310. I/O devices, including video and audio adapters, non-volatile storage, external peripheral links such as USB, Bluetooth, etc., camera/microphone data capture devices, fingerprint readers and other biometric sensors, as well as network interface devices such as those communicating via Wi-Fi or LTE-family interfaces, are collectively represented as I/O devices and networking 312, which interface with interconnect 306 via corresponding I/O controllers 314.

In a related embodiment, input/output memory management unit (IOMMU) 315 supports secure direct memory access (DMA) by peripherals. IOMMU 315 may provide memory protection by mediating access to memory 308 from I/O device 312. IOMMU 315 may also provide DMA memory protection in virtualized environments, where it allows certain hardware resources to be assigned to certain guest VMs running on the system, and enforces isolation between other VMs and peripherals not assigned to them.

On the software side, a pre-operating system (pre-OS) environment 316, which is executed at initial system start-up and is responsible for initiating the boot-up of the operating system. One traditional example of pre-OS environment 316 is a system basic input/output system (BIOS). In present-day systems, a unified extensible firmware interface (UEFI) is implemented. Pre-OS environment 316 is responsible for initiating the launching of the operating system or virtual machine manager, but also provides an execution environment for embedded applications according to certain aspects.

Virtual machine monitor (VMM) 318 is system software that creates and controls the execution of virtual machines (VMs) 320A and 320B. VMM 318 may run directly on the hardware HW, as depicted, or VMM 318 may run under the control of an operating system as a hosted VMM.

Each VM 320A, 320B includes a guest operating system 322A, 322B, and application programs 324A, 324B. Each guest operating system (OS) 322A, 322B provides a kernel that operates via the resources provided by VMM 318 to control the hardware devices, manage memory access for programs in memory, coordinate tasks and facilitate multitasking, organize data to be stored, assign memory space and other resources, load program binary code into memory, initiate execution of the corresponding application program which then interacts with the user and with hardware devices, and detect and respond to various defined interrupts. Also, each guest OS 322A, 322B provides device drivers, and a variety of common services such as those that facilitate interfacing with peripherals and networking, that provide abstraction for corresponding application programs 324A, 324B so that the applications do not need to be responsible for handling the details of such common operations. Each guest OS 322A, 322B additionally may provide a graphical user interface (GUI) that facilitates interaction with the user via peripheral devices such as a monitor, keyboard, mouse, microphone, video camera, touchscreen, and the like. In some embodiments, guest OS 322B may omit a GUI.

Each guest OS 322A, 322B may provide a runtime system that implements portions of an execution model, including such operations as putting parameters onto the stack before a function call, the behavior of disk input/output (I/O), and parallel execution-related behaviors.

In addition, each guest OS 322A, 322B may provide libraries that include collections of program functions that provide further abstraction for application programs. These include shared libraries, dynamic linked libraries (DLLs), for example. Application programs 324A, 324B are those programs that perform useful tasks for users, beyond the tasks performed by lower-level system programs that coordinate the basis operability of the computer system itself.

VM 320A and VM 320B may be regarded as distinct clients that are hosted on the processing device. Their respective memory spaces are mutually isolated. Additionally, their cryptographic keys and cryptographic operations are likewise kept strictly isolated by security accelerator 303C, even from VMM 318 and from the other hardware components such as microprocessor 303A, system interconnect 306, and memory management device 304, for instance, according to aspects of this disclosure.

According to some aspects, secure workloads running in TEEs can use network security key protection trust in a security accelerator, such as security accelerator 292 or 303C, to securely perform cryptography operations, secure key storage and, generally, network security functions. In one example, the trust in hardware for network security key protection is rooted in the secure provisioning of security credentials in security accelerators 292, 303C by a trusted entity. The trusted entity may be the manufacturer of security accelerator 292, 303C, for example. In other examples, the trusted entity may be a distributor of the security accelerator 292, 303C, an original equipment manufacturer (OEM) of a product incorporating security accelerator 292, 303C, a credential authority, an owner or system administrator entity of a system in which security accelerator 292, 303C is deployed, or the like. In a related aspect, these security credentials are per-part unique, and hence each instantiation of the security acceleration coprocessing may be uniquely verifiable by a relying entity such as an application, VM, VNF, or the like.

According to a related aspect, a key-protection trust relationship is established between a client and a security service provider based on an assurance that security accelerator 292, 303C does not expose client keys or other secret values outside of its secure TEE.

According to another related aspect, security accelerator 292, 303C may be authenticated by a relying party (e.g., client, security server) before trusting the security accelerator to maintain and use a given cryptographic key or other secret.

Figure 4A:
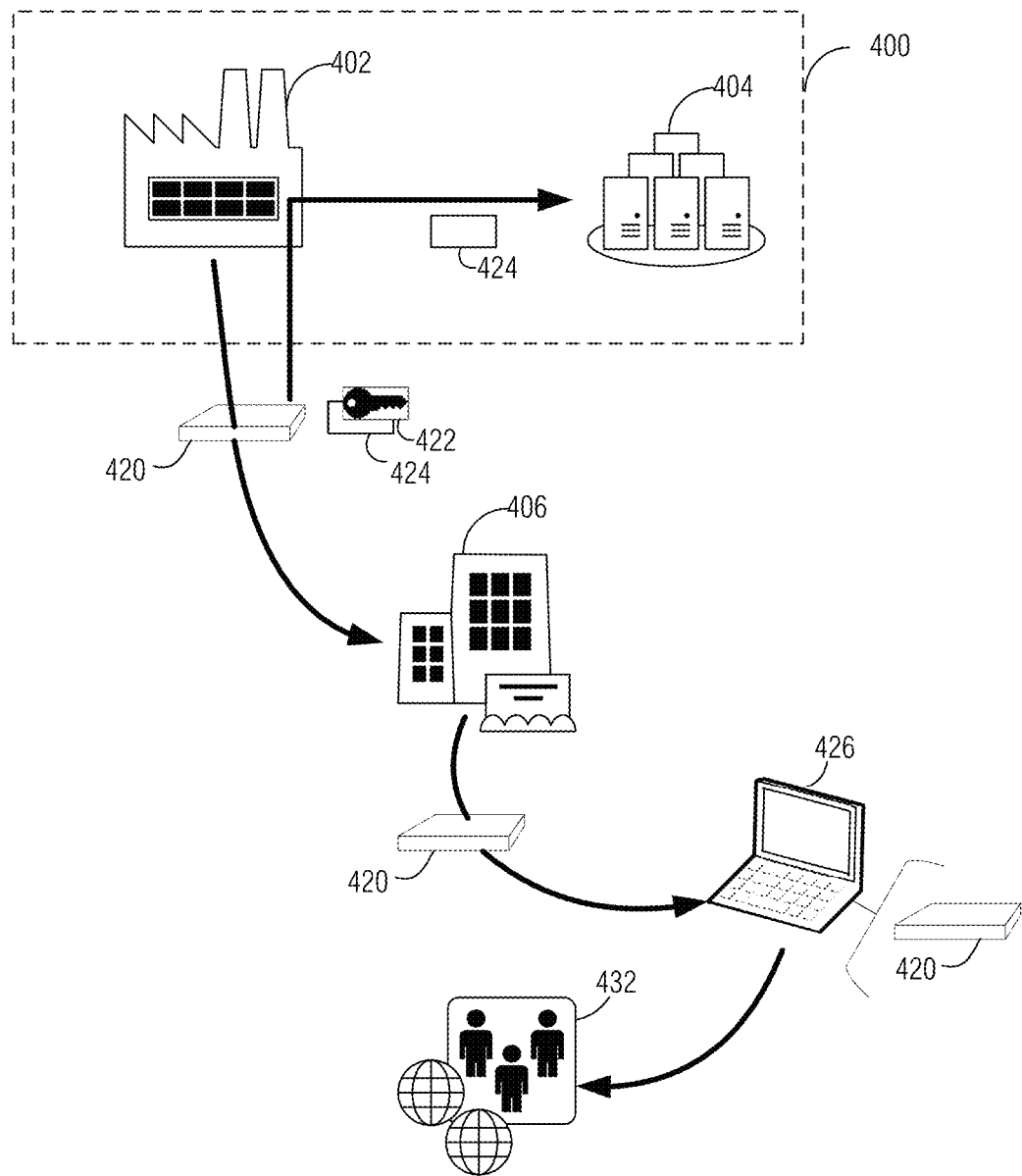
FIG. 4A is a simplified production flow diagram illustrating portions of manufacturing and distribution processes of a security accelerator in which an initial root of trust is established.

FIG. 4A is a simplified production flow diagram illustrating portions of manufacturing and distribution processes of a security accelerator 420, such as security accelerator 292 or 303C, in which an initial root of trust is established. Manufacturer 400 includes factory 402 and secure service 404. Factory 402 is a semiconductor fabrication and testing facility that physically produces security accelerator 420. Secure service 404 is a server that maintains a secure database of manufactured devices and their respective bases for authentication, such as cryptographic keys, and the like.

Manufactured security accelerator 420 may be transferred to a distributor or OEM 406 (which may be the same entity as the manufacturer of the security accelerator, or a third-party entity), that incorporates the security accelerator 420 into an end-product 426, such as a CPU or computing platform, or any apparatus that uses the security accelerator, such as a computing platform that executes VMs, an industrial device, a consumer-electronics device, a wireless communications device, a medical device, a vehicle, an appliance, a network interface device, a networking infrastructure device, a device that implements NFV, etc. The end-product 426 may be further transferred to a retailer 432, and ultimately to the end-customer.

According to some embodiments, an initial basis for authentication of security accelerator 420 is configured into the device by a trusted entity, such as manufacturer 400, for example. As depicted, the initial basis for authentication includes a secret value 422, which may be generated by the trusted entity (e.g., operating on behalf of the manufacturer) and maintained exclusively and securely on security accelerator 420.

In various embodiments, the secret value may be a private key, or some other secret value that is based on a randomly-generated seed value.

In a related example, a seed value may be generated on board the security accelerator 420 (e.g., by a random-number generator circuit, a physical unclonable function cell, or the like), or it may be provided to security accelerator 420 from a secure external source at the fabrication facility that uses a suitable mechanism for generating the value.

In another example, security accelerator 292, 303 additionally generates a derived value 424 that is based on the secret value 422. Derived value 424 may be a public key associated with a secret private key, or it may be a cryptographic hash based at least in part on the secret value, or it may be a result of a pseudo random function based at least in part of the secret value. Derived value 424 may be shared with secure service 404, to be maintained for future use.

In an example, secret value 422, derived value 424, or both, may be imprinted or stored in security accelerator 420 via silicon transistors, controllers, or any external NVRAM or ROM that is inextricably securely bound to the security accelerator.

Figure 4B:
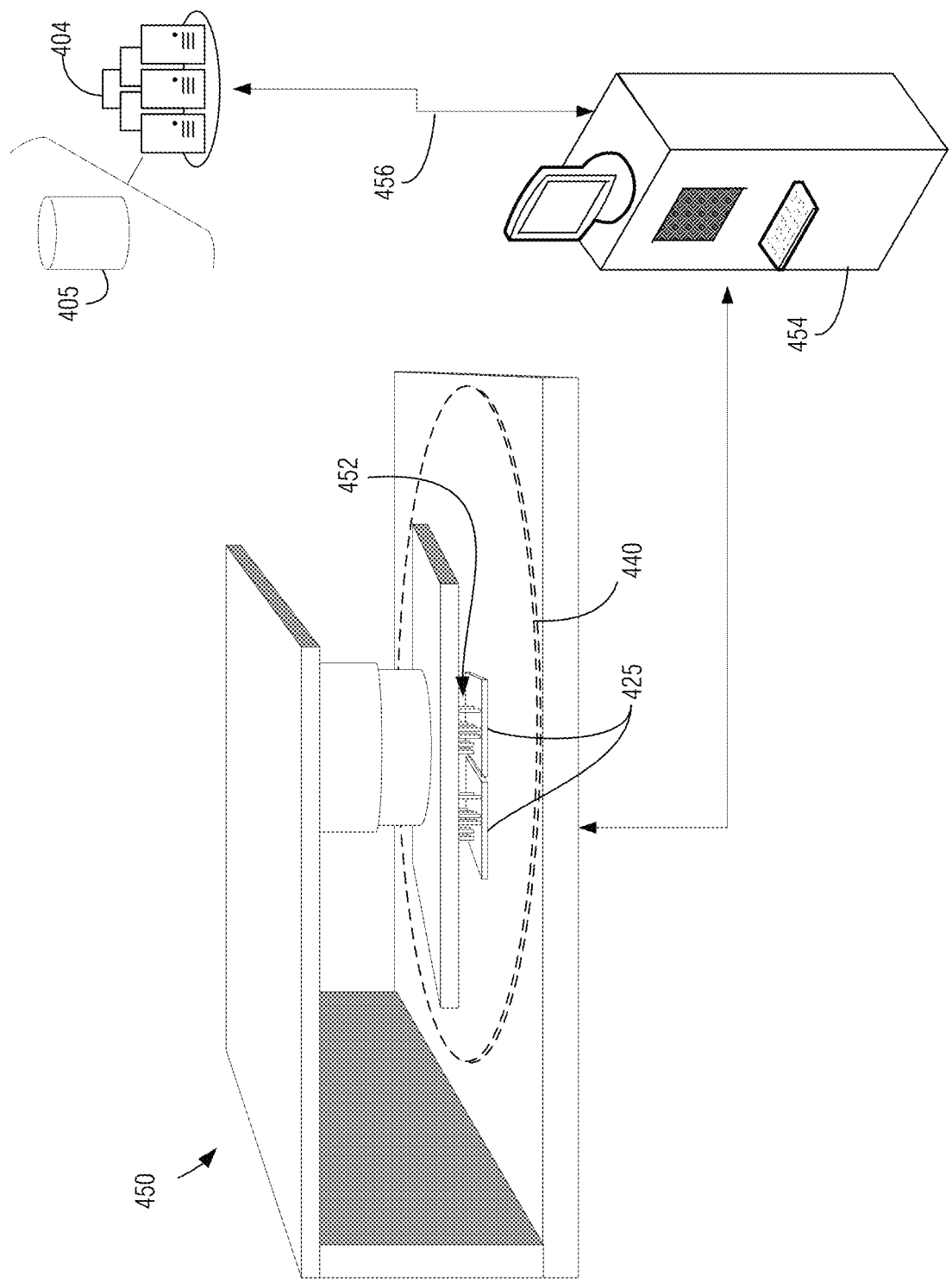
FIG. 4B is a schematic diagram illustrating portions of a manufacturing process where the initial basis for authentication is configured into a security accelerator according to an example.

FIG. 4B is a schematic diagram illustrating portions of the manufacturing process where the initial basis for authentication is configured into security accelerator 292, 303 according to some embodiments. The manufacturing process carried out by factory 402 includes a manufacturing fixture 450 that supplies power and input signals to security accelerator 420. As depicted, manufacturing fixture 450 may be an in-circuit test fixture that uses a set of contact probes 452 to connect with power and input/output pads formed on the security accelerator's integrated circuit (IC) die 425. In various embodiments, an in-circuit testing arrangement may be performed when the IC die of security accelerator 420 is still on wafer 440, or it may be performed later in the manufacturing process, before or after packaging of security accelerator 420.

Manufacturing fixture 450 includes controller 454, which includes a computing device having processing and communications facilities that are communicatively coupled to secure service 404. Secure service 404 maintains secure database 405 in which bases for authentication may be stored for each individual manufactured security accelerator.

In an example, a pair of individualized, device-specific, asymmetric keys is generated by secure service 404 and subsequently encrypted by an additional part-SKU key (which may be a symmetric key or one key of an asymmetric pair) prior to transmission to manufacturing fixture 450. In turn, manufacturing fixture 450 decrypts the key pair using a suitable key to recover the device-specific asymmetric keys. Manufacturing fixture 450 transfers the recovered keys to security accelerator 420 during its manufacture as secret value 422.

In a related example in which security accelerator 420 generates derived value 424, controller 454 passes the derived value 424 to secure service 404 via interface 456. In a related embodiment, prior to sending the derived value 424 to secure service 404, manufacturing fixture 450 digitally signs the derived value 424.

Figure 5:
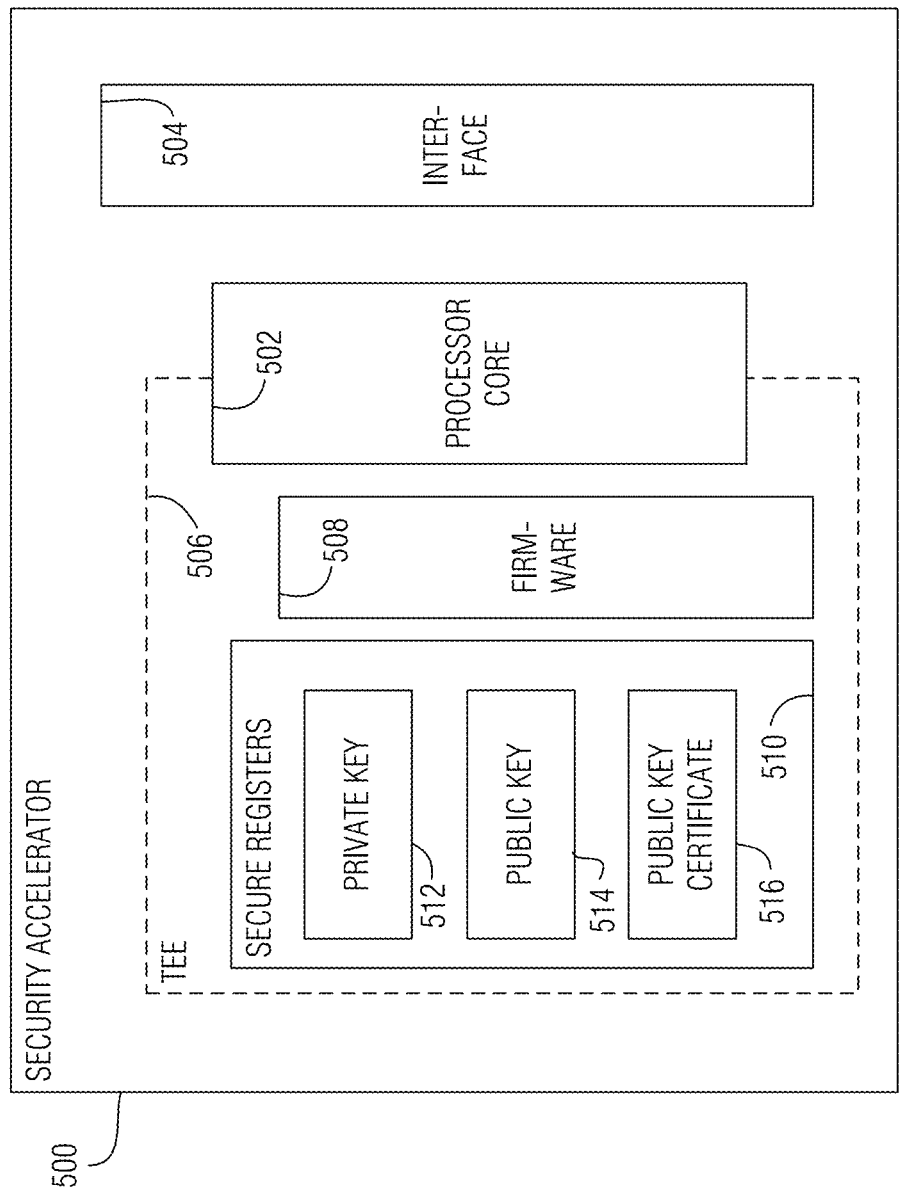
FIG. 5 is a diagram illustrating some of the components and information stored by a security accelerator according to an example.

FIG. 5 is a diagram illustrating some of the components and information stored by a security accelerator according to an example. As depicted, security accelerator 500 includes processor core 502 that performs execution of program instructions. Processor core 502 may be optimized in its architecture to perform cryptography computations in particular. Interface 504 of security accelerator 500 includes facilitates data communications with other entities, such as applications, VMs, VNFs, etc. Also, security accelerator 500 includes TEE 506, in which firmware 508 is executed. TEE 506 in TEE 506 also includes a set of secure registers 510, such as factory-programmable fuses, for example. Upon establishment of the root of trust, secure registers 510 store device-specific private key 512. In a related example, as shown, secure registers 510 may also store the matching public key 514, public key certificate (PKC) 516, and other pertinent information. Notably, the information stored in secure registers 510 may be accessed by firmware 508 of TEE 506, but access to the secure registers from the outside of TEE 506 is prohibited.

Figure 6:
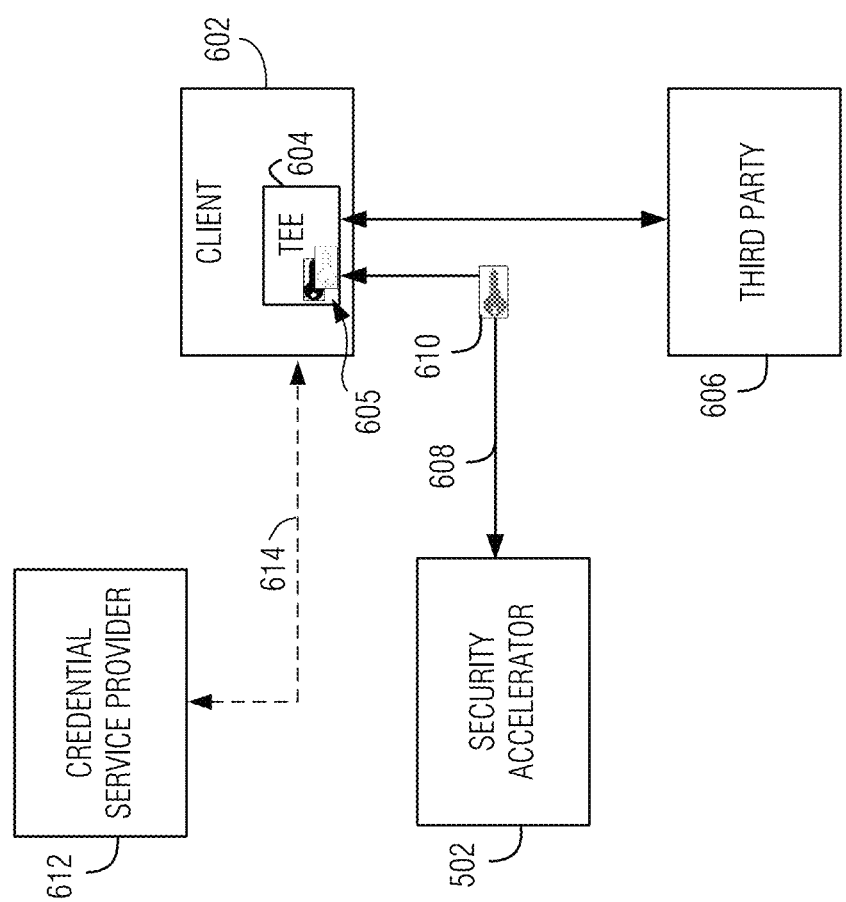
FIG. 6 is a diagram illustrating a basic use case scenario in which client entity makes use of a security accelerator for secret-based operations, while supplying the cryptographic keys or other relevant secret values according to an example.

FIG. 6 is a diagram illustrating a basic use case scenario in which client entity 602, which may be an application, system software, a VM instance, a NFV instance, IoT device, networking device such as a network interface controller (NIC), device controller (e.g., disk or solid-state drive controller), memory controller, trust domain controller, or the like, which makes use of security accelerator 500 for cryptography computations or other secret-based operations, while supplying the cryptographic keys or other relevant secret values according to an example. Client 602 may include TEE 604 in which a secret value, such as an asymmetric key pair 605 that includes a private key belonging to client 602, is initially stored. In a related example, the private key belonging to client 602 may be initially stored by another entity, such as a key-storage service, secure virtual machine, or the like, which may be hosted on a remote system and operating on behalf of client 602.

Client 602 securely provisions security accelerator 500 with its secret value (e.g., private key from key pair 605) following establishment of trust relationship 608 between client 602 and security accelerator 500. As an example, trust relationship 608 may be implemented using shared symmetric wrapping key (SWK) 610.

Prior to establishment of trust relationship 608, client 602 discovers the availability of security accelerator 500, and the corresponding credentials for securely accessing security accelerator 500, using credential service provider (CSP) 612. CSP 612 may be a remote (e.g., cloud-based) service that may be accessed via out-of-band communications 614, for example.

Once trust relationship 608 is established and security accelerator 500 is provisioned with the client's private key, client 602 may securely communicate with third party 606 while relying on security accelerator 500 to handle the associated cryptography or secret-based computations.

Figure 7:
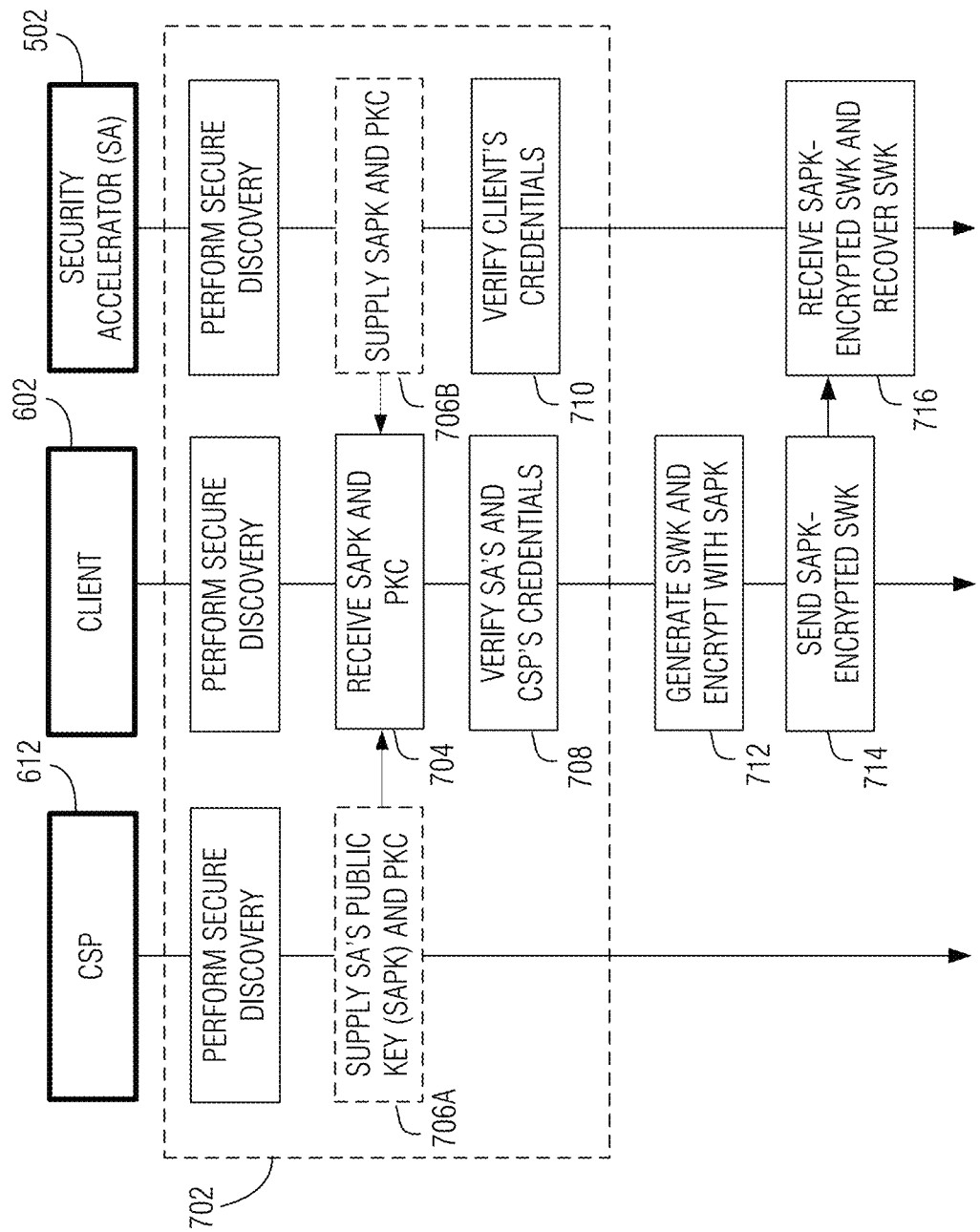
FIG. 7 is a flow diagram illustrating initiation and provisioning of a security accelerator according to an example.

FIG. 7 is a flow diagram illustrating initiation and provisioning of security accelerator 500 according to an example. Operations by CSP 612, client 602, and security accelerator 500 are shown. At 702, CSP 612, client 602, and security accelerator 500 may perform an initial discovery process in which the presence of applicable hardware platform components, such as security accelerator 500, any TEEs at client 602 or elsewhere in the infrastructure, etc., and any executed entities, is determined, and their respective authenticity is verified. Any suitable discovery/verification protocol may be employed including, for example, the Redfish™ protocol. An attestation-based regime may be utilized to ensure the identity and authenticity of the systems. In discovery stage 702, client 602 may receive the security accelerator's public key (SAPK), which can be provided by CSP 612 at 706A, by security accelerator 500 at 706B, or both. The SAPK may be provided in the form of a digital certificate signed by CSP 612 or a trusted certificate authority, for example.

At 708, client 602 verifies the credentials of security accelerator 500 and CSP 612 in accordance with a suitable verification protocol that relies on the integrity of the security accelerator's public/private key pair that is traceable to a trusted entity, such as the manufacturer of security accelerator 500 as discussed above. In a related example, at 710, security accelerator 500 may verify the credentials of client 602 to assure its authenticity as an additional layer of security against malicious attacks.

Upon completion of discovery 702, client 602 and security accelerator 500 establish a mutual trust relationship. In an example, the mutual trust relationship may be represented by a shared secret, such as a symmetric wrapper key (SWK). Accordingly, at 712, client 602 generates the SWK and encrypts it with the public key SAPK of security accelerator 500. In this encrypted state, only security accelerator 500 is able to recover the SWK. At 714, client 602 sends the SAPK-encrypted SWK to security authority 500. At 716, security accelerator 500 receives the SAPK-encrypted SWK, and recovers the plaintext SWK with its private key.

Figure 8:
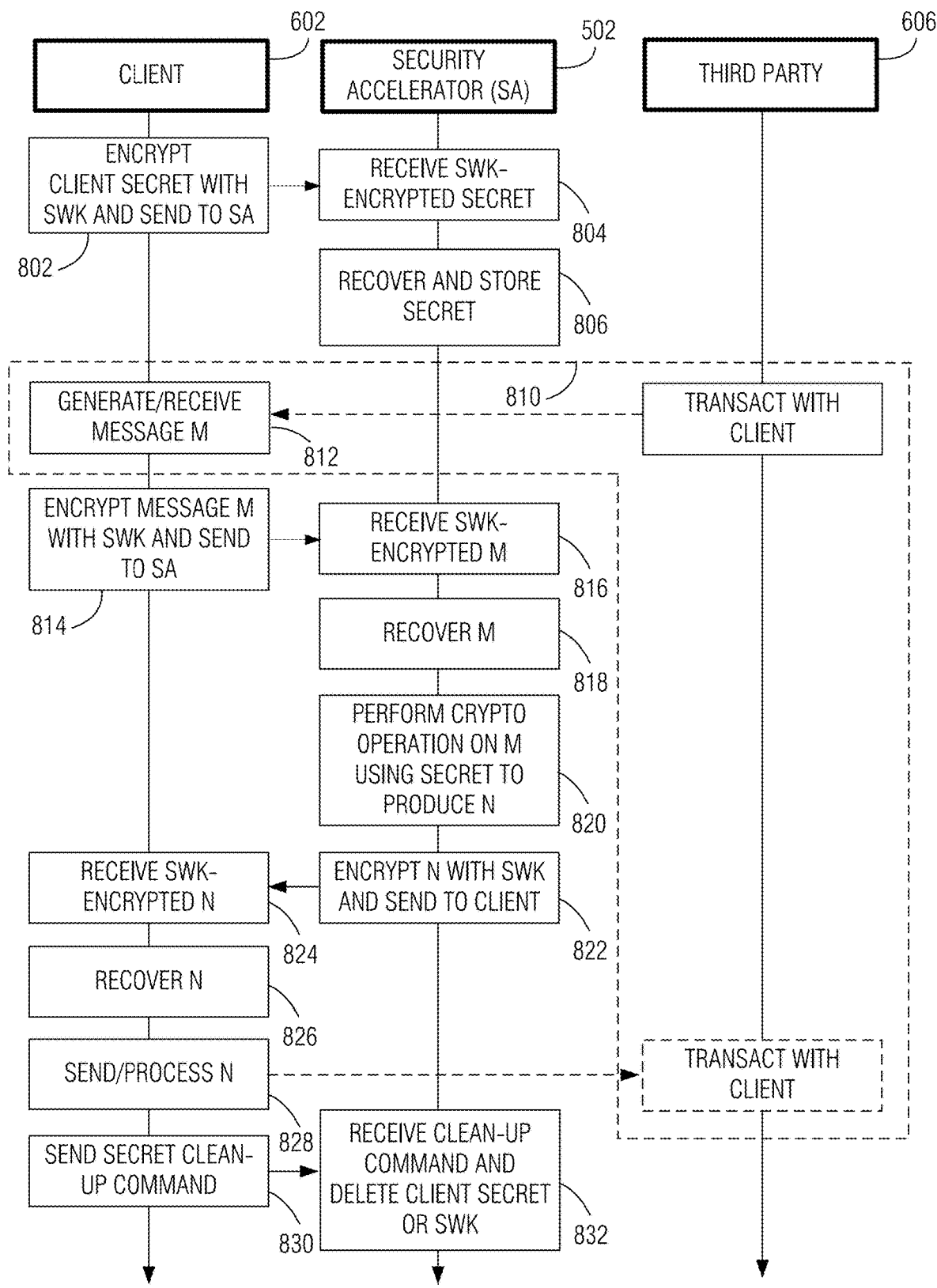
FIG. 8 is a flow diagram illustrating an example of a process for provisioning a security accelerator with the private key or other secret value belonging to the client entity, to be used for secret-based computations in support of the operations of the client entity.

FIG. 8 is a flow diagram illustrating an example of a process for provisioning security accelerator 500 with the private key or other secret value belonging to client 602, to be used for secret-based computations in support of the operations of client 602. At 802, client 602 encrypts its secret value with SWK in and sends it to security accelerator 500. At 804 security accelerator 500 receives the SWK-encrypted secret value and, at 806, decrypts the SWK-encrypted secret using its copy of SWK, and stores the secret value securely. Importantly, throughout this exchange, the secret value of client 602 is never exposed to any entity outside of the TEE of client 602 and the TEE security accelerator 500. Accordingly, the communications or other infrastructure that was used to deliver the secret, even if compromised, cannot access the secret value of client 602 without first breaking the SWK. At this stage, security accelerator 500 is provisioned with the secret value of client 602.

At runtime, client 602 may call upon security accelerator 500 to perform cryptographic or other security-related computations using the secret value of client 602. Advantageously, the use of security accelerator 500 can offload computationally-expensive cryptography operations, such as asymmetric key-related computations, onto security accelerator 500, which may have been especially adapted to this role. Client 602 and security accelerator 500 use a secure tunnel protected by encryption with the SWK to exchange information. In examples where the SWK is a symmetric key, the encryption/decryption operations using SWK are substantially less computationally expensive than asymmetric key cryptography operations.

As an example use scenario, at 810 client 602 may transact with third party 606. As part of the transaction, at 812 client 602 may generate message M for secure delivery to third party 606, or client 602 may receive secure message M in encrypted form. In the case where message M is generated by client 602, security accelerator 500 may be called upon to encrypt message M prior to its transmission by client 602. In the case where message M is received in encrypted form from third party 606, security accelerator 500 may be called upon to decrypt or sign received encrypted message M to recover plaintext message M.

Accordingly, at 814, in order to securely pass message M to security accelerator 500, client 602 encrypts message M with the SWK. At 816, security accelerator 500 receives SWK-encrypted message M and, at 818 recovers M using its copy of the SWK. At 820, security accelerator 500 performs security operations on recovered message M using its local copy of the secret value of client 602 to either encrypt, or recover, the plaintext value of M (depending on the state of recovered M). The result of this operation produces message N as the encrypted or recovered version of message M.

At 822, security accelerator 500 encrypts message N with the SWK and passes it back to client 602. At 824, client 602 receives SWK-encrypted message N and, at 826, recovers message N. At 828, client 602 may send message N to third party 606 in furtherance of their transaction, or it may process message N in the case where message N is received from third party 606, for example.

In a related aspect, the client secret value, the SWK, or both, may be revoked or renewed at security accelerator 500. This may be done in accordance with a credential-retention policy instituted by client 602 or by a system manager, for instance. A credential-retention policy may be instituted in accordance with a greater credential-protection policy that can define an expiration time for a security credential, or set limits as to the quantity of security credentials that a client entity may have at a time.

As a basic example, at 830 client 602 may send a clean-up command to security accelerator 500. In response, at 832, security accelerator 500 receives the clean-up command, and securely deletes or overwrites the client's secret value or the SWK.

As discussed above, aspects of the present subject matter may be implemented in a variety of use case scenarios, including NFV, VMs, IoTs, Universal Terrestrial Radio Access Networks (UTRANs), just to name a few.

Figure 9:
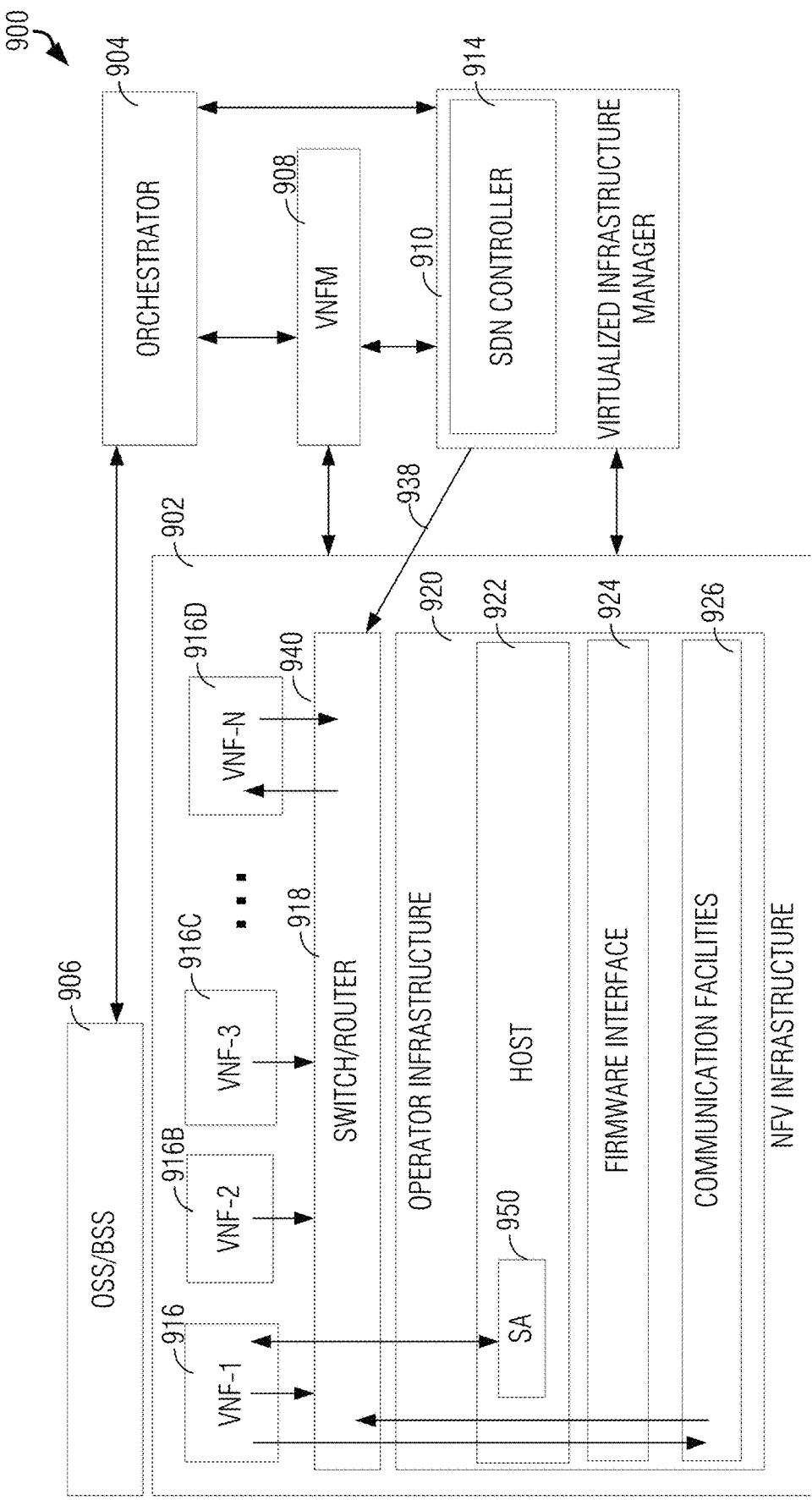
FIG. 9 is a diagram depicting an example of a system for implementing network function virtualization incorporating aspects of the present subject matter.

To illustrate a NFV use case scenario, FIG. 9 depicts an example of a system 900 for implementing network function virtualization. It will be understood that the system 900 is provided for example illustration of the capabilities and forms that an NFV deployment may take, and that many variations to the structure and function of NFV systems may be used with the present disclosure.

The system 900 as illustrated includes NFV infrastructure 902, orchestrator 904, operations support system (OSS)/business support system (BSS) 906, VNF monitor (VNFM) 908, and virtualized infrastructure manager (VIM) 910. Fewer or additional components may be integrated into system 900.

NFV infrastructure 902 virtualizes network node functions that may be chained together to create, for example, communication services. NFV infrastructure 902 as illustrated includes virtual network functions (VNFs) 916A, 916B, 916C, and 916D, a switch/router 918, and an operator infrastructure 920.

VNFs 916A-916D are virtualized tasks formerly carried out by dedicated hardware. VNFs 916A-916D move these operations previously performed by the dedicated hardware to software instantiations. VNFs 916A-916D operate by virtue of the hardware and/or software programming of the host 922.

switch/router 918 provides communication capability between platforms 926A-926B or VNFs 916A-916D. A switch may be used to connect computers or other network devices. A router may be used to connects a first network to a second network, such as by connecting a network to the internet. The router may generally manage a path of data (e.g., a request, message, or a response, among others) provided to another network.

Operator infrastructure 920, for instance, may host other operators' VNFs and includes the host 922 (e.g., operating system (OS), cloud OS, and/or hypervisor), a firmware interface 924 (e.g., a unified extensible firmware interface (UEFI) or basic input/output system (BIOS)), one, or a plurality of platforms 926 (for example), and interconnect circuitry 928 (e.g., input/output (I/O) ports, network interface controller (NIC), switch, host fabric interface (HFI), or the like).

Host 922 can include hardware or software for providing resources used by the VNFs 916A-916D for performing their operations. Host 922 can include an OS, cloud OS, hypervisor, or the like on which VNFs 916A-D can operate. Firmware interface 924 can include a UEFI, BIOS, or the like. Firmware interface 924 defines a software interface between host 922 and firmware (e.g., VNF 916A-916D). Host 922 may include security accelerator 950.

Communication facilities 926 provides communication functionality for devices connected to a communication network. Examples of functionality provided by facilities 926 include voice lines and internet access, and operations for supporting the voice and internet access, among others.

Orchestrator 904 performs resource and/or network service orchestration. The orchestrator 904 binds functions provided by the VNFs 916A-916D, such as to create a service in an otherwise dispersed NFV environment. The orchestrator 904 can help ensure that adequate compute, storage, and/or other network resources are available to provide a network service. The orchestrator 904 can authorize, coordinate, release, and govern VNFs 916A-916D sharing resources of the infrastructure 902.

In an example, the OSS/BSS 906 are computer systems used by telecom service providers to manage their networks. The OSS/BSS 906 can support network inventory, configuration, fault management, and/or service provisioning. They may also include a remote security module or a remote security credential store.

The virtual network function manager (VNFM) 908 works with orchestrator 904 and virtualized infrastructure manager (VIM) 910 to provide VNF capability. VNFM 908 may instantiate VNFs 916A-916D, scale VNFs 916A-916D, update and/or upgrade the VNFs 916A-916D, and/or terminate VNFs 916A-916D. VNFM 908 can manage a single VNF or multiple VNFs. VNFM 908 maintains the virtualized resources that support the VNF 916A-916D. VNFM may also include NFV security control functionality.

VIM 910 as illustrated includes a software-defined networking (SDN) controller 914. VIM 910 controls and manages compute, storage, and other network resources of the infrastructure 902. VIM 910 can maintain a list of which virtual resources are allocated which physical resources, manage security group policies (for access control), manage a repository of NFV hardware resources and software resources, such as to help improve and optimize the use of system resources.

SDN controller 914 is an application that manages flow control, such as within networks. SDN controller 914 allows a server or other network resource to select a switched packet destination, indicating to a switch where to send a packet. SDN controller 914 can take a control plane of network hardware and run it as software, and can distribute monitoring policies.

In implementing aspects of the present disclosure, NFV orchestrator 904 discovers the availability of security accelerator 950 on host 922. NFV Orchestrator 904 delivers this capability availability to VNFM 908. VNFM 908 may remotely and securely enable security accelerator 950 on racks or entire Data Centers, or remote Edge Cloud deployments. VNFM 908 provisions security accelerator 950 with the applicable infrastructure security processing keys. VNFM 908 passes the platform identity to one or more VNFs 916-916D, a remote security module, or a remote security credential server, which can then use the public key of security accelerator 950 to provision the SWK as discussed in the example above. Once provisioned, the usage will occur using the VM/VNF interface to security accelerator 950.

Additional examples of the presently described method, system, and device embodiments are suggested according to the structures and techniques described above, and specified in the following examples and claims.

Example 1 is a security accelerator device, comprising: execution hardware including at least one processor core, and non-volatile data storage hardware, wherein the data storage hardware includes: a first credential that is uniquely associated with the individual security accelerator device and represents a root of trust to a trusted entity; and instructions that, when executed by the execution hardware, cause the security accelerator device to: establish a cryptographic trust relationship with a client entity that is based on the root of trust, the cryptographic trust relationship being represented by a second credential; receive and store a secret client credential of the client entity, wherein the secret client credential is received from the client entity via communication secured by the second credential; and execute a cryptographic computation using the secret client credential on behalf of the client entity to produce a computation result.

The trusted entity to which the root of trust is traceable may be the manufacturer of the security accelerator device, a distributor of the security accelerator device, an original equipment manufacturer of a product incorporating security accelerator device, a credential authority, an owner or system administrator entity of a system in which security accelerator device is deployed, or the like.

In Example 2, the subject matter of Example 1 includes, wherein the first credential is permanently set in the security accelerator device.

In Example 3, the subject matter of Examples 1-2 includes, wherein the first credential includes an asymmetric private key.

In Example 4, the subject matter of Example 3 includes, wherein the data storage hardware includes a public key certificate that includes a public key that corresponds to the asymmetric private key.

In Example 5, the subject matter of Examples 1-4 includes, wherein the non-volatile data storage hardware includes a set of factory-programmable fuses, and wherein the first credential is stored in the factory-programmable fuses.

In Example 6, the subject matter of Examples 1-5 includes, wherein the second credential is a symmetric key.

In Example 7, the subject matter of Examples 1-6 includes, wherein the secret credential client is an asymmetric private key of the client entity.

In Example 8, the subject matter of Examples 1-7 includes, wherein the instructions, when executed by the execution hardware, cause the security accelerator device to pass the computation result to the client entity via a secured return communication.

In Example 9, the subject matter of Example 8 includes, wherein the secured return communication is secured by the second credential.

In Example 10, the subject matter of Examples 1-9 includes, wherein the instructions, when executed by the execution hardware, cause the security accelerator to receive a request from the client entity to perform the cryptographic computation.

In Example 11, the subject matter of Example 10 includes, wherein the request is secured by the second credential.

In Example 12, the subject matter of Examples 1-11 includes, wherein the instructions, when executed by the execution hardware, cause the security accelerator to pass the computation result to the client entity.

In Example 13, the subject matter of Examples 1-12 includes, wherein the instructions, when executed by the execution hardware, cause the security accelerator to delete the second credential in response to a call for deletion based on a security policy.

In Example 14, the subject matter of Examples 1-13 includes, wherein the instructions, when executed by the execution hardware, cause the security accelerator device to perform a verification of a publicly-available credential of the client entity.

In Example 15, the subject matter of Examples 1-14 includes, wherein the instructions, when executed by the execution hardware, cause the security accelerator device to perform a secure discovery procedure.

In Example 16, the subject matter of Examples 1-15 includes, wherein the security accelerator device is interfaced with the client entity via a communication network.

In Example 17, the subject matter of Examples 1-16 includes, wherein the security accelerator device is interfaced with the client entity via a system interconnect.

Example 18 is a computing platform, comprising: execution hardware including at least one processor core, and data storage hardware, wherein the data storage hardware includes: a secret client credential; and instructions that, when executed by the execution hardware, cause the computing platform to: instantiate a client entity configured to; receive a first credential of a security accelerator device, the first credential being is uniquely associated with the security accelerator device and representing a root of trust to a trusted entity; establish a cryptographic trust relationship with the security accelerator device that is based on the root of trust, the cryptographic trust relationship being represented by a second credential; provide the secret client credential to the security accelerator device via communication secured by the second credential; send a message to the security accelerator device to be cryptographically processed by the security accelerator device using the secret client credential to produce a computation result; and receive the computation result.

The trusted entity to which the root of trust is traceable may be the manufacturer of the security accelerator device, a distributor of the security accelerator device, an original equipment manufacturer of a product incorporating security accelerator device, a credential authority, an owner or system administrator entity of a system in which security accelerator device is deployed, or the like.

In Example 19, the subject matter of Example 18 includes, wherein the first credential includes an asymmetric public key.

In Example 20, the subject matter of Examples 18-19 includes, wherein the second credential is a symmetric key.

In Example 21, the subject matter of Examples 18-20 includes, wherein the secret credential client is an asymmetric private key of the client entity.

In Example 22, the subject matter of Examples 18-21 includes, wherein the instructions, when executed by the execution hardware, cause the computing platform to generate the second credential.

In Example 23, the subject matter of Example 22 includes, wherein the instructions, when executed by the execution hardware, cause the computing platform to encrypt the second credential with the first credential to produce an encrypted second credential and provide the encrypted second credential to the security accelerator device to establish the cryptographic trust relationship.

In Example 24, the subject matter of Examples 18-23 includes, wherein the instructions, when executed by the execution hardware, cause the computing platform to generate a request to the security accelerator device to perform a cryptographic computation on the message.

In Example 25, the subject matter of Example 24 includes, wherein the request is secured by the second credential.

In Example 26, the subject matter of Examples 18-25 includes, wherein the computation result as received is encrypted by the second credential, and wherein the instructions, when executed by the execution hardware, cause the computing platform to recover the computation result in plaintext form.

In Example 27, the subject matter of Examples 18-26 includes, wherein the client entity is configured to execute a trusted execution environment in which the secret client credential and the second credential are stored.

In Example 28, the subject matter of Examples 18-27 includes, wherein the instructions, when executed by the execution hardware, cause the computing platform to issue a call to the security accelerator device to delete the second credential, wherein issuance of the call is based on a security policy that defines a limit on a quantity of credentials that the client entity may possess.

In Example 29, the subject matter of Examples 18-28 includes, wherein the instructions, when executed by the execution hardware, cause the computing platform to issue a call to the security accelerator device to delete the second credential, wherein issuance of the call is based on a security policy that defines an expiration time for the second credential.

In Example 30, the subject matter of Examples 18-29 includes, wherein the instructions, when executed by the execution hardware, cause the computing platform to perform a verification of the first credential of the security accelerator device.

In Example 31, the subject matter of Examples 18-30 includes, wherein the instructions, when executed by the execution hardware, cause the computing platform to perform a secure discovery procedure.

In Example 32, the subject matter of Examples 18-31 includes, wherein the computing platform is configured to execute a hypervisor.

In Example 33, the subject matter of Examples 18-32 includes, wherein the computing platform is configured to execute a network function virtualization system.

In Example 34, the subject matter of Examples 18-33 includes, wherein the computing platform is a wireless communication device configured for operation in a universal terrestrial radio access network.

In Example 35, the subject matter of Examples 18-34 includes, wherein the computing platform is an Internet of Things endpoint.

In Example 36, the subject matter of Examples 18-35 includes, wherein the computing platform is interfaced with the security accelerator device via a communication network.

In Example 37, the subject matter of Examples 18-36 includes, wherein the computing platform is interfaced with the security accelerator device via a system interconnect.

Example 38 is a method for operating a security accelerator device, comprising: storing, in non-volatile memory, a first credential that is uniquely associated with the individual security accelerator device and represents a root of trust to a trusted entity; and establishing, by the security accelerator device, a cryptographic trust relationship with a client entity that is based on the root of trust, the cryptographic trust relationship being represented by a second credential; receiving and storing, by the security accelerator device, a secret client credential of the client entity, wherein the secret client credential is received from the client entity via communication secured by the second credential; and executing, by the security accelerator device, a cryptographic computation using the secret client credential on behalf of the client entity to produce a computation result.

The trusted entity to which the root of trust is traceable may be the manufacturer of the security accelerator device, a distributor of the security accelerator device, an original equipment manufacturer of a product incorporating security accelerator device, a credential authority, an owner or system administrator entity of a system in which security accelerator device is deployed, or the like.

In Example 39, the subject matter of Example 38 includes, wherein storing the first credential in the security accelerator device includes permanently storing the first credential.

In Example 40, the subject matter of Examples 38-39 includes, wherein the first credential includes an asymmetric private key.

In Example 41, the subject matter of Example 40 includes, storing, by the security accelerator device, a public key that corresponds to the asymmetric private key.

In Example 42, the subject matter of Examples 38-41 includes, wherein the second credential is a symmetric key.

In Example 43, the subject matter of Examples 38-42 includes, wherein the secret credential client is an asymmetric private key of the client entity.

In Example 44, the subject matter of Examples 38-43 includes, passing, by the security accelerator device, the computation result to the client entity via a secured return communication.

In Example 45, the subject matter of Example 44 includes, securing, by the security accelerator device, the secured return communication by the second credential.

In Example 46, the subject matter of Examples 38-45 includes, wherein the instructions, further comprising: receiving, by the security accelerator device, a request from the client entity to perform the cryptographic computation.

In Example 47, the subject matter of Example 46 includes, wherein the request is secured by the second credential.

In Example 48, the subject matter of Examples 38-47 includes, passing, by the security accelerator device, the computation result to the client entity.

In Example 49, the subject matter of Examples 38-48 includes, deleting, by the security accelerator device, the second credential in response to a call for deletion based on a security policy.

In Example 50, the subject matter of Examples 38-49 includes, performing, by the security accelerator device, a verification of a publicly-available credential of the client entity.

In Example 51, the subject matter of Examples 38-50 includes, performing, by the security accelerator device, a secure discovery procedure.

In Example 52, the subject matter of Examples 38-51 includes, wherein the security accelerator device is interfaced with the client entity via a communication network.

In Example 53, the subject matter of Examples 38-52 includes, wherein the security accelerator device is interfaced with the client entity via a system interconnect.

Example 54 is a security accelerator device, comprising: means for storing a first credential that is uniquely associated with the individual security accelerator device and represents a root of trust to a trusted entity; means for establishing a cryptographic trust relationship with a client entity that is based on the root of trust, the cryptographic trust relationship being represented by a second credential; means for receiving and storing a secret client credential of the client entity, wherein the secret client credential is received from the client entity via communication secured by the second credential; and means for executing a cryptographic computation using the secret client credential on behalf of the client entity to produce a computation result.

In Example 55, the subject matter of Example 54 includes, wherein the means for storing the first credential in the security accelerator device includes means for permanently storing the first credential.

In Example 56, the subject matter of Examples 54-55 includes, wherein the first credential includes an asymmetric private key.

In Example 57, the subject matter of Example 56 includes, means for storing a public key that corresponds to the asymmetric private key.

In Example 58, the subject matter of Examples 54-57 includes, wherein the second credential is a symmetric key.

In Example 59, the subject matter of Examples 54-58 includes, wherein the secret credential client is an asymmetric private key of the client entity.

In Example 60, the subject matter of Examples 54-59 includes, means for passing the computation result to the client entity via a secured return communication.

In Example 61, the subject matter of Example 60 includes, means for securing the secured return communication by the second credential.

In Example 62, the subject matter of Examples 54-61 includes, wherein the instructions, further comprising: means for receiving a request from the client entity to perform the cryptographic computation.

In Example 63, the subject matter of Example 62 includes, wherein the request is secured by the second credential.

In Example 64, the subject matter of Examples 54-63 includes, means for passing the computation result to the client entity.

In Example 65, the subject matter of Examples 54-64 includes, means for deleting the second credential in response to a call for deletion based on a security policy.

In Example 66, the subject matter of Examples 54-65 includes, means for performing a verification of a publicly-available credential of the client entity.

In Example 67, the subject matter of Examples 54-66 includes, means for performing a secure discovery procedure.

Example 68 is at least one machine-readable medium (e.g., a non-transitory machine-readable storage medium) comprising: a secret client credential; and instructions that, when executed by execution hardware, cause the execution hardware to: instantiate a client entity configured to; receive a first credential of a security accelerator device, the first credential being is uniquely associated with the security accelerator device and representing a root of trust to a trusted entity; establish a cryptographic trust relationship with the security accelerator device that is based on the root of trust, the cryptographic trust relationship being represented by a second credential; provide the secret client credential to the security accelerator device via communication secured by the second credential; send a message to the security accelerator device to be cryptographically processed by the security accelerator device using the secret client credential to produce a computation result; and receive the computation result.

In Example 69, the subject matter of Example 68 includes, wherein the first credential includes an asymmetric public key.

In Example 70, the subject matter of Examples 68-69 includes, wherein the second credential is a symmetric key.

In Example 71, the subject matter of Examples 68-70 includes, wherein the secret credential client is an asymmetric private key of the client entity.

In Example 72, the subject matter of Examples 68-71 includes, wherein the instructions, when executed by the execution hardware, cause the execution hardware to generate the second credential.

In Example 73, the subject matter of Example 72 includes, wherein the instructions, when executed by the execution hardware, cause the execution hardware to encrypt the second credential with the first credential to produce an encrypted second credential and provide the encrypted second credential to the security accelerator device to establish the cryptographic trust relationship.

In Example 74, the subject matter of Examples 68-73 includes, wherein the instructions, when executed by the execution hardware, cause the execution hardware to generate a request to the security accelerator device to perform a cryptographic computation on the message.

In Example 75, the subject matter of Example 74 includes, wherein the request is secured by the second credential.

In Example 76, the subject matter of Examples 68-75 includes, wherein the computation result as received is encrypted by the second credential, and wherein the instructions, when executed by the execution hardware, cause the execution hardware to recover the computation result in plaintext form.

In Example 77, the subject matter of Examples 68-76 includes, wherein the client entity is configured to execute a trusted execution environment in which the secret client credential and the second credential are stored.

In Example 78, the subject matter of Examples 68-77 includes, wherein the instructions, when executed by the execution hardware, cause the execution hardware to issue a call to the security accelerator device to delete the second credential, wherein issuance of the call is based on a security policy that defines a limit on a quantity of credentials that the client entity may possess.

In Example 79, the subject matter of Examples 68-78 includes, wherein the instructions, when executed by the execution hardware, cause the execution hardware to issue a call to the security accelerator device to delete the second credential, wherein issuance of the call is based on a security policy that defines an expiration time for the second credential.

In Example 80, the subject matter of Examples 68-79 includes, wherein the instructions, when executed by the execution hardware, cause the execution hardware to perform a verification of the first credential of the security accelerator device.

In Example 81, the subject matter of Examples 68-80 includes, wherein the instructions, when executed by the execution hardware, cause the execution hardware to perform a secure discovery procedure.

Example 82 is a computing platform, comprising: means for storing a secret client credential; and means for receiving a first credential of a security accelerator device, the first credential being is uniquely associated with the security accelerator device and representing a root of trust to a trusted entity; means for establishing a cryptographic trust relationship with the security accelerator device that is based on the root of trust, the cryptographic trust relationship being represented by a second credential; means for providing the secret client credential to the security accelerator device via communication secured by the second credential; means for sending a message to the security accelerator device to be cryptographically processed by the security accelerator device using the secret client credential to produce a computation result; and means for receiving the computation result.

In Example 83, the subject matter of Example 82 includes, wherein the first credential includes an asymmetric public key.

In Example 84, the subject matter of Examples 82-83 includes, wherein the second credential is a symmetric key.

In Example 85, the subject matter of Examples 82-84 includes, wherein the secret credential client is an asymmetric private key of the client entity.

In Example 86, the subject matter of Examples 82-85 includes, means for causing the computing platform to generate the second credential.

In Example 87, the subject matter of Example 86 includes, encrypt the second credential with the first credential to produce an encrypted second credential and provide the encrypted second credential to the security accelerator device to establish the cryptographic trust relationship.

In Example 88, the subject matter of Examples 82-87 includes, means for generating a request to the security accelerator device to perform a cryptographic computation on the message.

In Example 89, the subject matter of Example 88 includes, wherein the request is secured by the second credential.

In Example 90, the subject matter of Examples 82-89 includes, wherein the computation result as received is encrypted by the second credential, and further comprising: means for recovering the computation result in plaintext form.

In Example 91, the subject matter of Examples 82-90 includes, means for executing a trusted execution environment in which the secret client credential and the second credential are stored.

In Example 92, the subject matter of Examples 82-91 includes, means for issuing a call to the security accelerator device to delete the second credential, wherein issuance of the call is based on a security policy that defines a limit on a quantity of credentials that the client entity may possess.

In Example 93, the subject matter of Examples 82-92 includes, means for issuing a call to the security accelerator device to delete the second credential, wherein issuance of the call is based on a security policy that defines an expiration time for the second credential.

In Example 94, the subject matter of Examples 82-93 includes, means for performing a verification of the first credential of the security accelerator device.

In Example 95, the subject matter of Examples 82-94 includes, means for performing a secure discovery procedure.

In Example 96, the subject matter of Examples 82-95 includes, means for executing a hypervisor.

In Example 97, the subject matter of Examples 82-96 includes, means for executing a network function virtualization system.

In Example 98, the subject matter of Examples 82-97 includes, wherein the computing platform is a wireless communication device configured for operation in a universal terrestrial radio access network.

In Example 99, the subject matter of Examples 82-98 includes, wherein the computing platform is an Internet of Things endpoint.

In Example 100, the subject matter of Examples 82-99 includes, wherein the computing platform is interfaced with the security accelerator device via a communication network.

In Example 101, the subject matter of Examples 82-100 includes, wherein the computing platform is interfaced with the security accelerator device via a system interconnect.

Example 102 is at least one machine-readable medium including instructions that, when executed by processing circuitry, cause the processing circuitry to perform operations to implement of any of Examples 1-101.

Example 103 is an apparatus comprising means to implement of any of Examples 1-101.

Example 104 is a system to implement of any of Examples 1-101.

Example 105 is a method to implement of any of Examples 1-101.

The above detailed description includes references to the accompanying drawings, which form a part of the detailed description. The drawings show, by way of illustration, specific examples that may be practiced. These examples are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

The above detailed description further includes various examples of structures for performing specific functions as recited in the enumerated examples, and which may be recited in one or more claims that specifically contain "means" terminology. For instance, with reference to enumerated example 54, the stated means for storing a first credential may be realized by structures such as secure registers 510 (FIG. 5), which may be implemented using non-volatile memory or permanent memory devices, as described above. Similarly, the stated means for establishing a cryptographic trust relationship with a client entity, the means for receiving and storing a secret client credential of the client entity, and the means for executing a cryptographic computation using the secret client credential on behalf of the client entity, may be realized by processor core 502, programmed to carry out an algorithm such as the one to be performed by security accelerator 502 in FIGS. 7-8.

With reference to enumerated example 82, the stated means for storing a secret client credential may be realized as TEE 290 (FIG. 2), non-volatile memory 309 (FIG. 3), host 922 (suitably partitioned for a corresponding VF 916 (FIG. 9), and other structures described above. The means for receiving a first credential of a security accelerator device, the means for establishing a cryptographic trust relationship with the security accelerator device, the means for sending a message to the security accelerator device to be cryptographically processed by the security accelerator device, and the means for receiving the computation result, may each be realized with a corresponding suitable combination of processing components such as interconnect 256, and in some cases, network interface 268 or wireless network transceiver 266 (FIG. 2), working with processor 252 programmed to execute an algorithm such as the one to be performed by client 602 in FIGS. 7-8, or by a suitable combination of components shown and described in connection with FIG. 3 or 9, as will be understood by persons skilled in the relevant arts. The above examples of structures corresponding to recited means are not an exhaustive list of all of the applicable structures that are detailed in the present specification.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other examples may be used, such as by one of ordinary skill in the art upon reviewing the above description. Also, in the above Detailed Description, various features may be grouped together to streamline the disclosure. However, the claims may not set forth every feature disclosed herein as examples may feature a subset of said features. Further, examples may include fewer features than those disclosed in a particular example. Thus, the following claims are hereby incorporated into the Detailed Description, with a claim standing on its own as a separate example. The scope of the examples disclosed herein is to be determined with reference to the appended claims, along with the full scope of equivalents to which such claims are entitled.

What is claimed is:

1. A security accelerator device, comprising:
   execution hardware including at least one processor core, and non-volatile data storage hardware, wherein the data storage hardware includes:
      a first credential that is uniquely associated with the security accelerator device and represents a root of trust to a trusted entity, wherein the trusted entity provides the first credential to the security accelerator device and wherein the first credential is a private key of a public/private key pair of the security accelerator device; and
      instructions that, when executed by the execution hardware, cause the security accelerator device to:
         receive, from a client entity, a symmetric wrapper key, wherein the symmetric wrapper key is encrypted with a public key of the public/private key pair of the security accelerator device;
         establish a cryptographic trust relationship with the client entity that is based on the root of trust, the cryptographic trust relationship being represented by a second credential and wherein the client entity executes with a processor separate from the at least one processor core and wherein the second credential is the symmetric wrapper key decrypted by the security accelerator device;
         receive from the client entity, a secret client credential of the client entity, wherein the secret client credential is encrypted with the symmetric wrapper key;
         decrypt the secret client credential with the symmetric wrapper key;
         store the secret client credential; and
         execute a cryptographic computation in a trusted execution environment of the security accelerator device using the secret client credential on behalf of the client entity to produce a computation result.

2. The security accelerator device of claim 1, wherein the first credential is permanently set in the security accelerator device.

3. The security accelerator device of claim 1, wherein the non-volatile data storage hardware includes a set of factory-programmable fuses, and wherein the first credential is stored in the factory-programmable fuses.

4. The security accelerator device of claim 1, wherein the instructions, when executed by the execution hardware, cause the security accelerator device to pass the computation result to the client entity via a secured return communication.

5. The security accelerator device of claim 1, wherein the instructions, when executed by the execution hardware, cause the security accelerator device to receive a request from the client entity to perform the cryptographic computation.

6. The security accelerator device of claim 1, wherein the instructions, when executed by the execution hardware, cause the security accelerator device to delete the second credential in response to a call for deletion based on a security policy.

7. The security accelerator device of claim 1, wherein the instructions, when executed by the execution hardware, cause the security accelerator device to perform a verification of a publicly-available credential of the client entity.

8. A computing platform, comprising:
   execution hardware including at least one processor core, and data storage hardware, wherein the data storage hardware includes:
      a secret client credential; and
      instructions that, when executed by the execution hardware, cause the computing platform to instantiate a client entity configured to:
         receive a first credential of a security accelerator device, the first credential being uniquely associated with the security accelerator device and representing a root of trust to a trusted entity, wherein the security accelerator device executes with a processor separate from the at least one processor core, wherein the first credential is a private key of a public/private key pair of the security accelerator device, and wherein the trusted entity provides the first credential to the security accelerator device;
         provide, to the security accelerator device, a symmetric wrapper key, wherein the symmetric wrapper key is encrypted with a public key of the public/private key pair of the security accelerator device;
         establish a cryptographic trust relationship with the security accelerator device that is based on the root of trust, the cryptographic trust relationship being represented by a second credential, wherein the second credential is the symmetric wrapper key decrypted by the security accelerator device;
         provide the secret client credential to the security accelerator device via communication secured by the second credential, wherein the secret client credential is encrypted with the symmetric wrapper key;
         send a message to the security accelerator device to be cryptographically processed by the security accelerator device in a trusted execution environment of the security accelerator device using the secret client credential to produce a computation result; and
         receive the computation result.

9. The computing platform of claim 8, wherein the instructions, when executed by the execution hardware, cause the computing platform to generate the second credential.

10. The computing platform of claim 9, wherein the instructions, when executed by the execution hardware, cause the computing platform to encrypt the second credential with the first credential to produce an encrypted second credential and provide the encrypted second credential to the security accelerator device to establish the cryptographic trust relationship.

11. The computing platform of claim 8, wherein the instructions, when executed by the execution hardware, cause the computing platform to generate a request to the security accelerator device to perform a cryptographic computation on the message.

12. The computing platform of claim 8, wherein the instructions, when executed by the execution hardware, cause the computing platform to issue a call to the security accelerator device to delete the second credential, wherein issuance of the call is based on a security policy that defines a limit on a quantity of credentials that the client entity is permitted to possess.

13. The computing platform of claim 8, wherein the instructions, when executed by the execution hardware, cause the computing platform to issue a call to the security accelerator device to delete the second credential, wherein issuance of the call is based on a security policy that defines an expiration time for the second credential.

14. The computing platform of claim 8, wherein the instructions, when executed by the execution hardware, cause the computing platform to perform a verification of the first credential of the security accelerator device.

15. The computing platform of claim 8, wherein the computing platform is interfaced with the security accelerator device via a communication network.

16. The computing platform of claim 8, wherein the computing platform is interfaced with the security accelerator device via a system interconnect.

17. A method for operating a security accelerator device, comprising:
  storing, in non-volatile memory, a first credential that is uniquely associated with the security accelerator device and represents a root of trust to a trusted entity, wherein the trusted entity provides the first credential to the security accelerator device and wherein the first credential is a private key of a public/private key pair of the security accelerator device;
  receiving, from a client entity, a symmetric wrapper key, wherein the symmetric wrapper key is encrypted with a public key of the public/private key pair of the security accelerator device;
  establishing, by the security accelerator device, a cryptographic trust relationship with the client entity that is based on the root of trust, the cryptographic trust relationship being represented by a second credential, wherein the security accelerator device and the client entity execute on separate processors, wherein the second credential is the symmetric wrapper key decrypted by the security accelerator device;
  receiving from the client entity, a secret client credential of the client entity, wherein the secret client credential is encrypted with the symmetric wrapper key;
  decrypting the secret client credential with the symmetric wrapper key;
  storing, in the non-volatile memory, the secret client credential; and
  executing, by the security accelerator device in a trusted execution environment of the security accelerator device, a cryptographic computation using the secret client credential on behalf of the client entity to produce a computation result.

18. The method of claim 17, further comprising:
  passing, by the security accelerator device, the computation result to the client entity via a secured return communication.

19. The method of claim 18, further comprising:
  securing, by the security accelerator device, the secured return communication by the second credential.

20. At least one non-transitory machine-readable medium, comprising:
  a secret client credential; and
  instructions that, when executed by execution hardware, cause the execution hardware to:
    instantiate a client entity configured to:
      receive a first credential of a security accelerator device, the first credential being uniquely associated with the security accelerator device and representing a root of trust to a trusted entity, wherein the security accelerator device executes on a processor separate from the execution hardware, wherein the first credential is a private key of a public/private key pair of the security accelerator device, and wherein the trusted entity provides the first credential to the security accelerator device;
      provide, to the security accelerator device, a symmetric wrapper key, wherein the symmetric wrapper key is encrypted with a public key of the public/private key pair of the security accelerator device;
      establish a cryptographic trust relationship with the security accelerator device that is based on the root of trust, the cryptographic trust relationship being represented by a second credential, wherein the second credential is the symmetric wrapper key decrypted by the security accelerator device;
      provide the secret client credential to the security accelerator device via communication secured by the second credential, wherein the secret client credential is encrypted with the symmetric wrapper key;
      send a message to the security accelerator device to be cryptographically processed by the security accelerator device in a trusted execution environment of the security accelerator device using the secret client credential to produce a computation result; and
      receive the computation result.

21. The at least one non-transitory machine-readable medium of claim 20, wherein the instructions, when executed by the execution hardware, cause the execution hardware to generate the second credential.

22. The at least one non-transitory machine-readable medium of claim 21, wherein the instructions, when executed by the execution hardware, cause the execution hardware to encrypt the second credential with the first credential to produce an encrypted second credential and provide the encrypted second credential to the security accelerator device to establish the cryptographic trust relationship.

23. The at least one non-transitory machine-readable medium of claim 20, wherein the instructions, when executed by the execution hardware, cause the execution hardware to generate a request to the security accelerator device to perform a cryptographic computation on the message.

24. The at least one non-transitory machine-readable medium of claim 23, wherein the request is secured by the second credential.

\* \* \* \* \*